(12) United States Patent
Scrandis et al.

(10) Patent No.: US 7,313,736 B2
(45) Date of Patent: *Dec. 25, 2007

(54) METHOD AND APPARATUS FOR AGGREGATING ALARMS AND FAULTS OF A COMMUNICATIONS NETWORK

(75) Inventors: Clark Scrandis, Columbia, MD (US); Michael B. Peters-Rodbell, Dayton, MD (US); Rajan Kapur, Ellicott City, MD (US); Srinivasa Hebbar, Columbia, MD (US); Martha Dunbar, Highland, MD (US)

(73) Assignee: Ciena Corporation, Linthicum, MD (US)

( * ) Notice: Subject to any disclaimer, the term of this patent is extended or adjusted under 35 U.S.C. 154(b) by 520 days.

This patent is subject to a terminal disclaimer.

(21) Appl. No.: 10/865,958

(22) Filed: Jun. 14, 2004

(65) Prior Publication Data

US 2004/0223461 A1    Nov. 11, 2004

Related U.S. Application Data

(62) Division of application No. 09/626,184, filed on Jul. 27, 2000, now Pat. No. 6,816,461.

(60) Provisional application No. 60/211,917, filed on Jun. 16, 2000.

(51) Int. Cl.
    *G06F 11/00* (2006.01)
(52) U.S. Cl. .................. 714/47; 370/242; 370/244
(58) Field of Classification Search .............. None
    See application file for complete search history.

(56) References Cited

U.S. PATENT DOCUMENTS

| | | | |
|---|---|---|---|
| 5,408,218 A | 4/1995 | Svedberg et al. | |
| 5,596,712 A | 1/1997 | Tsuyama et al. | |
| 5,737,319 A | 4/1998 | Croslin et al. | |
| 5,748,098 A | 5/1998 | Grace | |
| 5,761,429 A | 6/1998 | Thompson | |
| 5,771,274 A * | 6/1998 | Harris | 379/22.03 |
| 5,802,144 A | 9/1998 | Laird et al. | |

(Continued)

*Primary Examiner*—Marc Duncan
(74) *Attorney, Agent, or Firm*—Clements Walker; Christopher L. Bernard; Tyler S. Brown

(57) ABSTRACT

A distributed method and system of controlling a communications network having a plurality of spans of interconnected network elements some of which include a network element processor distributes network topology information to respective span databases; stores original fault objects in the respective span databases; advertises fault objects to other network element processors in a local span when the original fault affects network elements other than a network element in which the fault occurred; advertises alarm objects to other network element processors that are respectively associated with a circuit affected by the original faults; stores the advertised fault and alarm objects in the respective span databases; and performs distributed processing of the advertised fault and alarm objects with the other network element processors and the respective span databases. Aggregation of other faults and alarms that may be occurring on the communications network due to other faults other than the received fault aids in determining causality of the fault. Causality may be determined by correlating other faults and alarms with the received fault. If not a root cause of another fault or alarm, the received fault is sympathetic to another fault or alarm. Sympathetic faults are suppressed while root cause faults are promoted to an alarm and reported to affected network elements. The number of alarms viewed by a network manager as well as the reporting of alarms and underlying faults are reduced by performing such distributed alarm correlation and fault reporting suppression.

15 Claims, 16 Drawing Sheets

U.S. PATENT DOCUMENTS

| | | |
|---|---|---|
| 5,923,247 A | 7/1999 | Dowden et al. |
| 5,964,891 A | 10/1999 | Caswell et al. |
| 5,968,122 A | 10/1999 | Schlosser et al. |
| 5,978,115 A | 11/1999 | Condict et al. |
| 6,163,392 A | 12/2000 | Condict et al. |
| 6,170,067 B1 | 1/2001 | Liu et al. |
| 6,199,180 B1 | 3/2001 | Ote et al. |
| 6,239,699 B1* | 5/2001 | Ronnen ................. 340/517 |
| 6,282,678 B1 | 8/2001 | Snay et al. |
| 6,308,207 B1 | 10/2001 | Tseng et al. |
| 6,414,595 B1 | 7/2002 | Scrandis et al. |
| 6,421,349 B1 | 7/2002 | Grover |
| 6,421,791 B1 | 7/2002 | Cocco et al. |
| 6,490,693 B1 | 12/2002 | Briskey et al. |
| 6,604,208 B1* | 8/2003 | Gosselin et al. ................ 714/4 |
| 6,694,455 B1 | 2/2004 | Scrandis et al. |
| 6,707,795 B1* | 3/2004 | Noorhosseini et al. ...... 370/242 |
| 6,813,634 B1* | 11/2004 | Ahmed ...................... 709/224 |
| 6,816,461 B1* | 11/2004 | Scrandis et al. ............ 370/242 |
| 2001/0013107 A1* | 8/2001 | Lewis ......................... 714/47 |

\* cited by examiner

METHOD AND APPARATUS FOR AGGREGATING ALARMS AND FAULTS OF A COMMUNICATIONS NETWORK

CROSS REFERENCE TO RELATED APPLICATIONS

This application is a Divisional of Application No. 09/626,184, filed on Jul. 27, 2000 now U.S. Pat. Ser. No. 6,816,461, and for which priority is claimed under 35 U.S.C. § 120; and this application claims priority of Application No. 60/211,917 filed on Jun. 16, 2000 under 35 U.S.C. § 119; the entire contents of all are hereby incorporated by reference.

BACKGROUND OF THE INVENTION

1. Field of the Invention

The invention generally relates to distributed optical network management systems and methods. The invention more particularly relates to methods and systems that perform distributed optical network management of faults and alarms.

2. Description of Related Art

Optical communication systems are a substantial and fast growing constituent of communication networks. The expression "optical communication system," as used herein, relates to any system which uses optical signals to convey information across an optical waveguiding medium, for example, an optical fiber. Such optical systems include but are not limited to telecommunication systems, cable television systems, and local area networks (LANs). (Optical systems are described in Gowar, Ed. Optical Communication Systems, (Prentice Hall, New York) c. 1993, the disclosure of which is incorporated herein by reference.)

Currently, the majority of optical communication systems are configured to carry an optical channel of a single wavelength over one or more optical waveguides. To convey information from multiple sources, time-division multiplexing (TDM) is frequently employed. In TDM, a particular time slot is assigned to each signal source with the complete signal constructed from portions of the signal collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded (e.g., by laying more fiber optic cables), the cost of such expansion is prohibitive. Consequently, there exists a need for a cost-effective way to increase the capacity of existing optical waveguides.

Wavelength division multiplexing (WDM) is being explored as an approach for increasing the capacity of existing fiber optic networks. WDM systems typically include a plurality of transmitters, each respectively transmitting signals on a designated channel or wavelength. The transmitters are typically housed in a first terminal located at one end of a fiber. The first terminal combines the channels and transmits them on the fiber to a second terminal coupled to an opposite end of the fiber. The channels are then separated and supplied to respective receivers within the second terminal.

The WDM system described in the previous paragraph can be perceived as a point-to-point connection with multiple signals carried from one terminal to the other. However, it is frequently advantageous to add and drop channels at various locations between the two terminals. Accordingly, other network elements, such as add/drop modules are often provided along the fiber in order to inject and/or remove channels from the fiber. Moreover, if the fiber extends over long distances, it is necessary to segment the fiber into sections with each fiber section being coupled to another by an additional network element that amplifies the signal (e.g., an erbium doped fiber amplifier).

In addition to the information bearing channels described above, Condict '115 utilizes a service channel at a wavelength different than the information bearing channels and carrying diagnostic and span topology information can also be transmitted through each span. Information associated with a span may be coupled via Ethernet connections to an internet protocol (IP) router. This IP router passes the information via the Internet to additional IP routers. A local area network (LAN) then transmits the information between the IP routers and to the network monitoring equipment. Finally, information associated with a span is similarly passed to network monitoring equipment through Ethernet links and an IP router.

The Condict '115 patent ensures proper operation of the WDM system by monitoring each network element. In the event of a failure, such as a fiber break, the communication system maintains its ability to monitor each network element by using, for example, a service channel separate from the main optical communication channel. Moreover, the communication system automatically responds to a fault by having each network element identify itself and report information about its operating status.

The Condict '115 patent further includes an optical communication path and a plurality of network elements disposed along the optical communication path. A first network element coupled to the optical communication path includes a first processor and a first optical component. The status of the first optical component is monitored by the first processor. The first processor generates a first electrical signal in accordance with the status of the first optical component. The first network element also includes a service channel transmitter coupled to the first processor and emits a second optical signal to the optical communication path at a second wavelength different than the first plurality of wavelengths in response to the first electrical signal. The second optical signal being modulated in accordance with the second electrical signal. A second network element is coupled to the optical communication path and includes a second processor, a second optical component coupled to the second processor and a service channel receiver coupled to the first processor and to the optical communication path. The receiver senses the second optical signal. The service channel receiver outputs a second electrical signal to the second processor in response to the second optical signal. The second processor controls the second optical component in response to the second electrical signal.

The Condict '115 patent span management systems and methods manage a span of an optical network in which each network element exchanges identification and status information for performing various monitoring and control functions in the optical network.

SUMMARY OF THE INVENTION

Condict '115 provides powerful and effective solutions for managing an optical communications network. The present invention expands upon these capabilities by more effectively managing multiple spans and solving the diverse challenges presented by the management and control of complex communication networks having a variety of topologies and span designs.

The present invention includes systems and methods that manage a communications network having a single span or multiple spans. The features of the invention may be added to a conventional communications network such as an electrical, optical, or electro-optical communications network in which a plurality of network elements convey information over one or more links or spans of the network. Furthermore, the inventive systems and methods and may be integrated into various proprietary, standard, and future-developed communications systems or methods including multiplexed [e.g. TDM (time division multiplexed), WDM (wave division multiplexed), or nonmultiplexed communications systems.

One of the implementations of the inventions includes incorporating or otherwise utilizing central processing elements distributed across network elements of a communications system. Either some or all of the network elements having such central processing elements may be programmed with a distributed intelligence and utilize a distributed database to intelligently manage the network.

The management features of the invention include distributed management of faults, alarms, and various network topology and control information.

A fault is any condition, error, failure, or problem that may cause or contribute to an immediate or future negative impact on a communications network. The types and varieties of faults are too numerous to exhaustively list here and are dependent upon the exact equipment and methods used by the communications network but some examples are a failure or degradation of an amplifier, multiplexer, demultiplexer, fiber, switch, software, service, nodal control processor or components thereof such as a fiber grating outside its operating temperature range or a pumping laser not operating within nominal parameters provisioning errors, missing equipment, transmitter failures, receiver failures, power failures, signal level degradation, software errors, and communications errors.

Upon detecting any such fault, that fault is reported to the central processor of the network element responsible for monitoring faults occurring on the portion of the network in which the fault occurred.

The network element processor, according to the invention, receives a fault report (or fault object) indicating that a fault has occurred and determines whether the fault is sympathetic to another fault in the network. In other words, the network element processor determines if the fault was caused by another fault in the network. Sympathetic faults are suppressed by not reporting them to other network element processors.

For non-sympathetic faults, the network element processor asserts an alarm and also determines whether the fault affects other circuits. For example, when an amplifier amplifying several channels of a WDM (wave division multiplexed) signal fails several channels will be affected. These affected channels are examples of circuits that may be affected by a fault. The invention informs other network element processors in the network for each such affected circuit by, for example, broadcasting an alarm object data item throughout the network to the affected network element processors.

The term "circuit" as used herein is a broad term and may include a variety of different elements. For example, a typical high capacity communication network may include multiple levels of multiplexing one of which may be time division multiplexing (TDM) which takes multiple customer circuits and aggregates them into a single wavelength of a wavelength division multiplexed system. These wavelengths may then be aggregated into routerbands, and then these routerbands may be aggregated into a composite signal which is fed to the line amplifiers. A circuit, as used and defined herein may include any of these levels of multiplexing and may be generally described as the simplex path of data from the ingress point into the network, through the network and finally to an egress point in the network. An example of a simple circuit is the customer signal arrives as a transmitter, the signal is modulated to a different wavelength and multiplexed into the fiber and then finally received and demodulated back to the customer.

Moreover, the relationships between the alarms may be between common equipment (e.g., amplifiers) and circuits; common facilities (e.g., fiber) and circuits; circuit specific equipment (e.g., transceiver equipment failures) and circuits as well as conditions reported at downstream equipment.

In addition to the processing of the alarms by the network element processors, the alarms may also be received by a network manager or interface which displays the alarm information to a user such as a technician attempting to diagnose and correct the fault. As the complexity of communications networks increase so does the number and complexity of potential faults and alarms. Indeed, without the inventive systems and methods the technician could be presented with a bewildering array of alarms and would have great difficulty diagnosing and correcting the problem (s) that triggered the alarms.

The invention reduces the number of alarms (as well as the reporting of underlying faults) by performing distributed alarm correlation and fault reporting suppression. The number of alarm and fault data objects further reduced by appropriately clearing both the alarm and original fault object that triggered the alarm from the database in which they are stored.

The database is preferably a distributed database that is distributed across each of the network element processors. The database not only stores the fault and alarm objects but also network topology information such as the address, identity, connectivity, and functionality of each network elements and components thereof. The database, also termed "span database" herein is utilized, inter alia, to determine the root cause of a fault, identify sympathetic faults, determine what affect a fault has on other circuits, etc.

By utilizing the distributed span database, the distributed network element processors can readily identify the root cause of faults, suppress the reporting of sympathetic faults to other NEPs, and generate appropriate alarms for that are advertised (broadcasted) to other NEPs. The distributed span database is particularly useful when correlating faults to other alarms and faults so as to detect causality. These capabilities permit more expeditious identification of problems and implementation of remedies to address the problem.

One of the inventions includes a distributed method of controlling a communications network having a plurality of spans of interconnected network elements wherein at least two of the network elements on each span include a network element processor, including: distributing network topology information to respective span databases at each of the network element processors; storing original fault objects in the respective span databases at the network element processor responsible for monitoring the occurrence of each of the original faults occurring in a respective span of the communications network; advertising fault objects to other network element processors in a local span when the original fault affects network elements other than a network element in which the fault occurred; advertising alarm objects to other network element processors that are respectively associated with a circuit affected by the original faults; storing the advertised fault and alarm objects in the respective span databases; and performing distributed processing of the advertised fault and alarm objects with the other network element processors and the respective span databases.

This distributed processing may also include correlating the alarm and fault objects at each of the network element processors; clearing fault and alarm objects from the respective span databases; advertising an alarm object to other network element processors respectively associated with a circuit affected by the fault or alarm object being cleared; correlating fault objects being cleared with other fault and span objects; suppressing reporting of the original fault object to other network element processors when the original fault object is sympathetic to another fault; and/or correlating the advertised alarm objects with other alarm objects and fault objects to determine a root cause of the advertised alarm objects.

Another of the inventions includes a method of controlling a network element to perform distributed management of a communications network having at least one span, including: receiving a fault; aggregating other faults, one or more alarms associated with the fault and one or more alarms that may be occurring on the communications network due to other faults other than the received fault; and correlating the other faults and the one or more alarms with the received fault to determine if the received fault is sympathetic to at least one of the alarms or the other faults.

Furthermore, the aggregating step may introducing a delay related to a number of network elements in the communications network.

If the communications network includes multiple spans, then the method may include multispan aggregating one or more multispan alarms associated with the received fault and one or more multispan alarms that may be occurring on the communications network due to the other faults; and multispan correlating the one or more multispan alarms with the received fault to determine if the received fault is sympathetic to at least one of the other faults or at least one of the multispan alarms.

Another inventive method controls a network element processor of a communications network having at least one span, including: associating a received fault, received by the network element processor, to a circuit topology of the communications network; determining whether the received fault is sympathetic to at least one other fault or alarm in a same circuit as the received fault based on said associating step; and suppressing reporting of the received fault to a network monitoring interface of the communications network when the received fault is sympathetic to the at least one other fault or alarm in the same circuit.

The invention may also determine if the received fault affects at least one other circuit different than the circuit associated with the received fault; and advertise the alarm object to all network element processors associated with each of the circuits affected by the received fault.

The invention also includes a method of building a database of circuit topology information; and storing the database in each of the network element processors to create a distributed span database that may be used, inter alia, to determine whether the received fault is a sympathetic fault.

Yet another invention processes span alarm objects in a communications network having a plurality of network elements including a first network element and a second network element by adding a current span alarm object to a database of the first network element; determining if the current span alarm object corresponds to an existing span alarm object previously received by the first network element; incrementing an instance count associated with the existing span alarm object when said determining step determines correspondence between the current span alarm object and the existing span alarm object; and storing the current span alarm object in the database when the determining step determines no correspondence between the current span alarm object and the existing span alarm object.

The instance count may be decremented when the current span alarm object is being cleared and when the instance count reaches zero the invention correlates at least one child alarm object that is a child of the current span alarm object (e.g., sympathetic to the current span alarm object being cleared) with other fault or alarm objects.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF PREFERRED EMBODIMENTS

As mentioned above, the present invention includes systems and methods for correlating alarms and appropriately suppressing the reporting of faults that may occur on a single span or multiple spans of a communications network. Such communication networks conventionally include a plurality of network elements. By providing some of these network elements with a network element processor designed and/or programmed according to the invention, the distributed network management functionality advantages of the invention can be enabled.

The network element processors (NEPs) periodically transmit identification and status information to the other NEPs in the network. The NEPs may also inform other NEPs of topology information. In this way, each NEP can build a database 100 so that, collectively, the network will include distributed processing as well as a distributed database.

If a service channel separate from the main communication channel(s) is provided such information may continue to be distributed among the NEPs even if a fiber break occurs in a segment of the network or if other major faults occur. Condict '115 describes one example of a service channel architecture and methodology than can be used with the present invention to provide such survivability upon fiber break or other major fault.

Figure 1A:
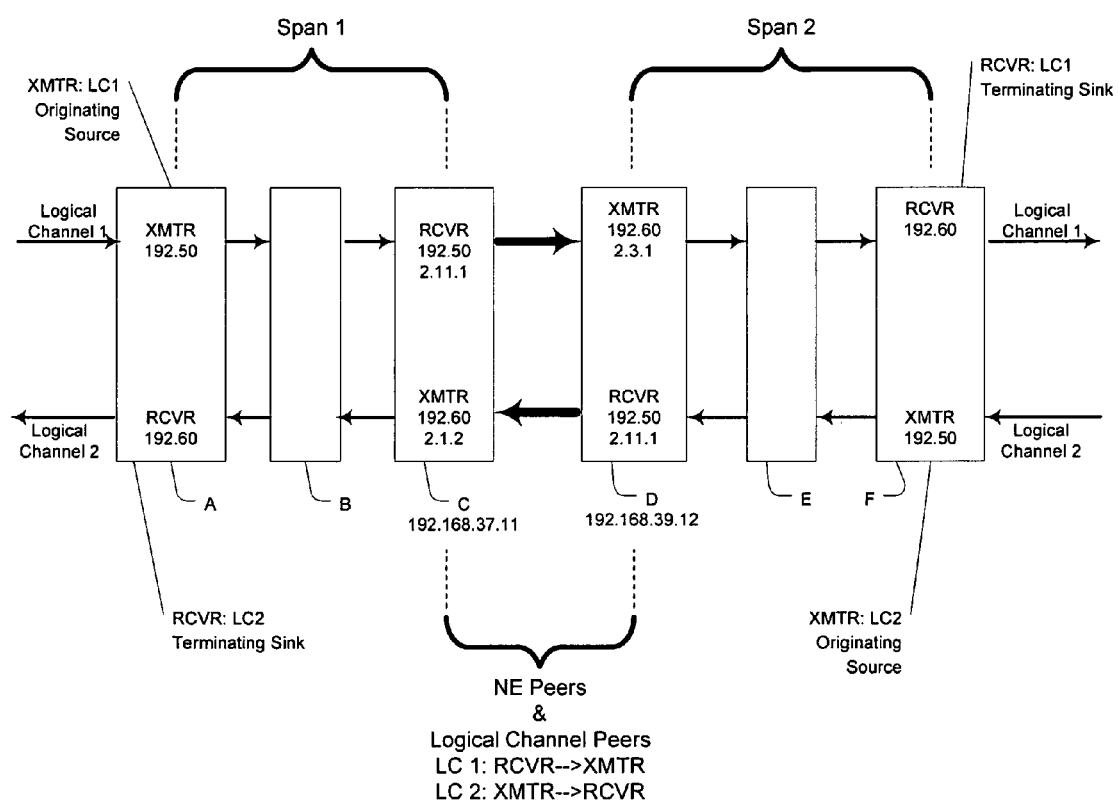
FIG. 1a is a block diagram of a multispan optical communications network illustrating multiple logical channels and network element addressing according to the invention.

FIG. 1a illustrates an exemplary multi-span architecture of the invention in greater detail. As discussed above each span includes two terminal network elements (terminal NE) as well as a plurality of other network elements, as required. These network elements can include regenerative devices, such as an amplifier, and/or an add/drop module Various span architectures are further discussed in relation to FIGS. 2a-c below. Generally speaking, an amplifier amplifies signals input thereto, while an add/drop module extracts/inserts one or more channels from the optical communication path.

As further shown in FIG. 1a, the communication pathways (shown using arrows and which may include optical fiber if the network is an optical communications network) may carry data communication channels in an "east" direction as well as a "west" direction. These pathways may also carry a service channel at a wavelength that is different than those associated with the data communication channels.

Figure 2A:
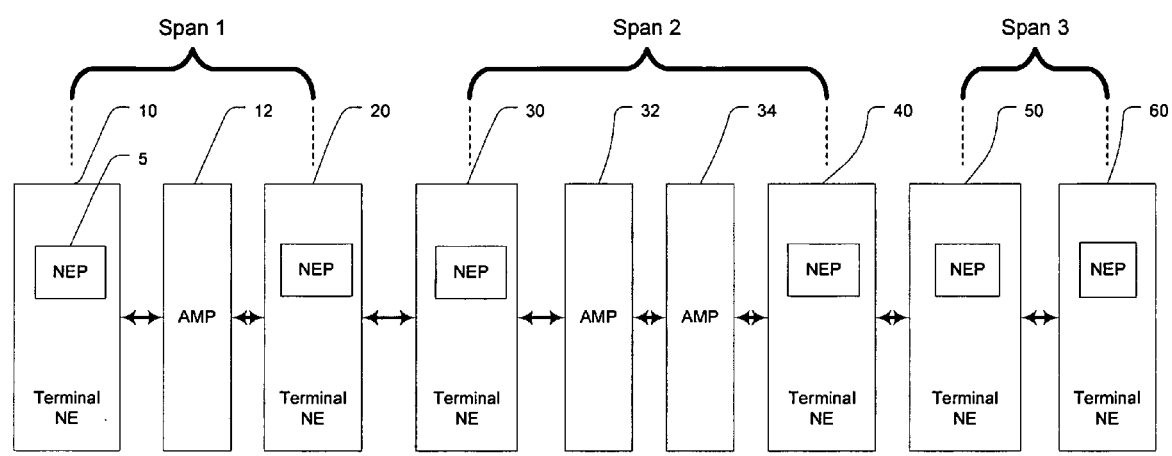
FIGS. 2a, 2b, and 2c are block diagrams of various communications network topologies according to the invention.
Figure 2B:
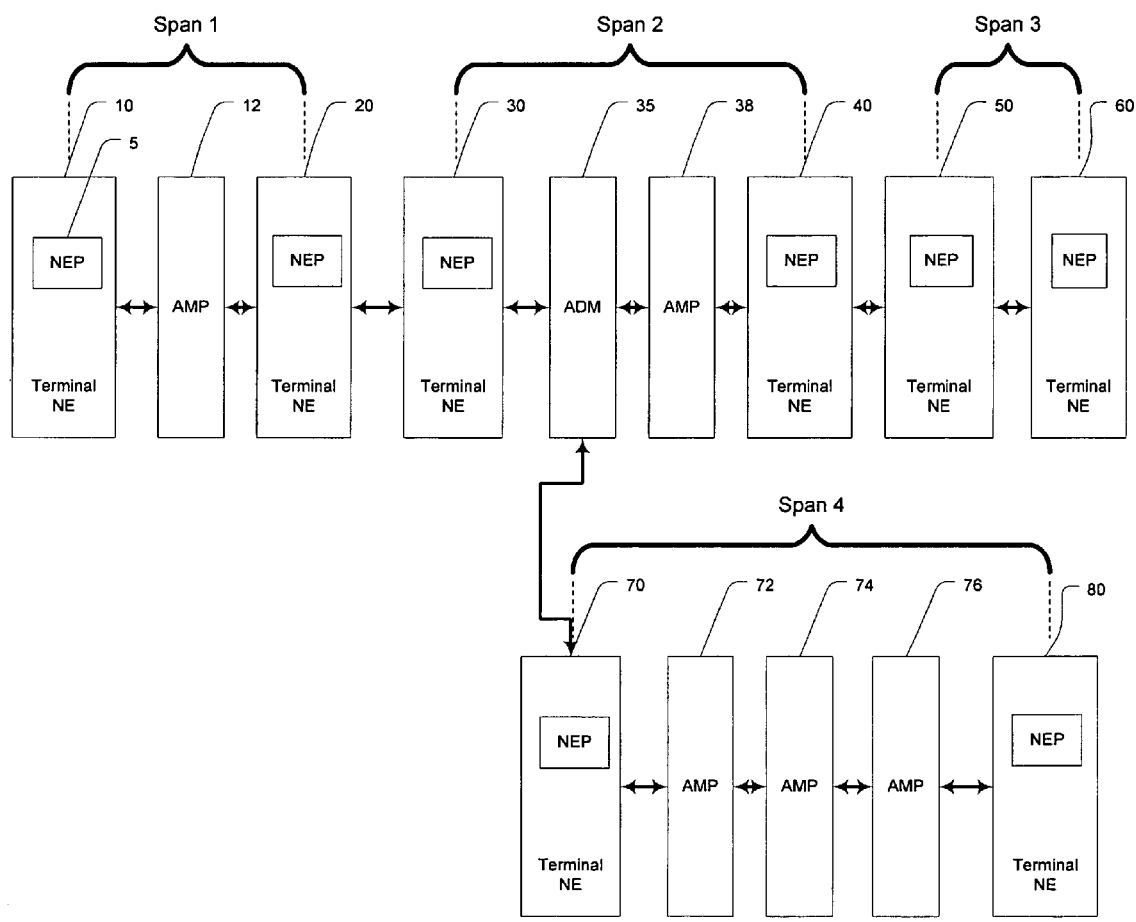
Figure 2C:
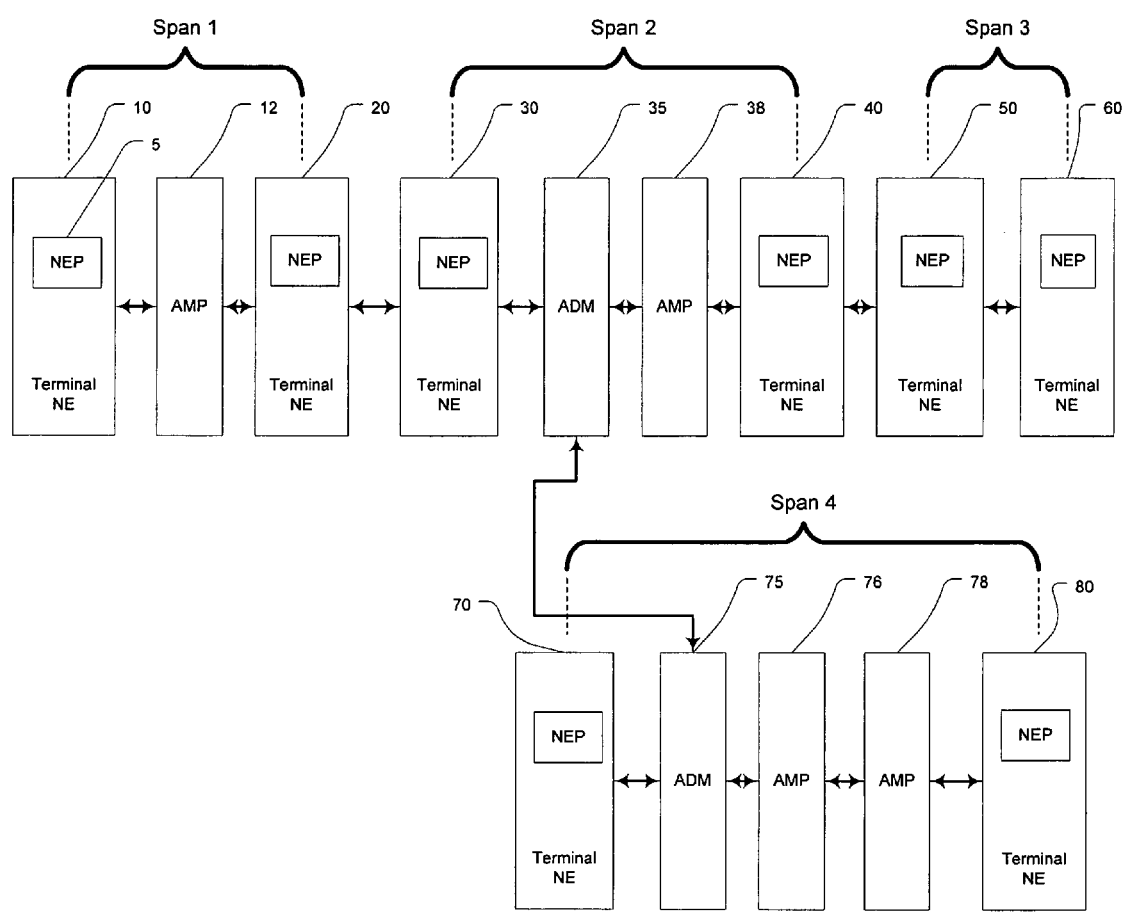

Generally, each terminal network element (A, B, C, D, E and F) includes a network element processor (NEP as shown in FIGS. 2a-c) that monitors, stores and transmits status and identification information to other network elements in the local span as well as to network elements in other spans. The NEPs also store and process the status and identification information of the other network elements in the local span and in other spans. Identification information can include, for example, the network address (e.g. IP address), and the physical location of the network element (e.g. rack, bay, shelf, etc).

The NEP may be constructed from a general purpose microprocessor or an application specific integrated circuit (ASIC). Each NEP may also include a transmission module or service channel modem (SCM), through which the NEP transmits and receives information with other NEPs.

For each communication channel, a network element can include one or more "sources," "sinks," and "blocks." A source is a point of channel origination, such as a laser, and is usually provided in a terminal. A sink is a point of channel termination where the channel is detected and associated information is passed beyond the span. Sinks are also provided in a terminal. A block, on the other hand, is a point of termination of at least one channel, usually without any further detection. Add/drop modules typically include sources, sinks and blocks.

In an optical communications environment, sinks and blocks generally include in-fiber Bragg gratings, which selectively reflect optical signals at a particular wavelength, while transmitting those at other wavelengths. In-fiber Bragg gratings generally constitute a periodic variation in refractive index over a section of fiber. (Bragg gratings are described in Morey et al., *Photoinduced Bragg Gratings in Optical Fibers*, Optics & Photonics News, February 1994, pp. 9-14, and A. M. Vengsarkar et al., *Long-Period Fiber Gratings As Band-Rejection Filters*, Journal of Lightwave Technology, vol. 14, no. 1, January 1996, pp. 58-65, the disclosures of which are incorporated herein by reference.) The periodic variation in refractive index can take the form of a series of "peaks" and "valleys," whereby the distance or period between two adjacent refractive index peaks defines, in part, the wavelength to be reflected by the Bragg grating.

The NEPs also store and transmit the operating status of the network. The status of the element may be operational, degraded or failed. If the element is degraded, it is still operational but may be relying on an auxiliary or redundant component because the main component has failed.

In network elements containing optical sources, the NEP periodically monitors and stores the status of the temperature, current, and power of the laser associated with each channel. At sinks and blocks, however, variations in the temperature of the grating can cause the grating to expand or contract, resulting in deviations in the period of the grating. In such instances, the grating may transmit the channel to be reflected, and, conversely, reflect the channels to be transmitted. Thus, the NEP monitors the temperature of the grating(s) in network elements, including sources and sinks.

As noted above, the NEPs monitor the status of the sources, sinks, and blocks for each channel in a network element. The status, along with identification information, including the network address, is supplied to the respective NEP for transmission to other NEPs in the span and may also be supplied to monitoring equipment (now shown) via external connections such as the Ethernet and Internet connections mentioned above.

To distribute the identification and status information, routing data (i.e., data required to direct the identification and status information to the NEPs), may also be distributed among the NEPs of the spans. Typically, routing information is distributed through two protocols. The first is typically a routing information protocol (RIP) utilized by the NEPs, to gather and distribute the identification and status information concerning their respective network element, and store such information about other network elements in the spans. The second is generally a media access control (MAC) protocol used by the SCMs which act, in part, as conduits for transmitting the status and identification information among the NEPs along the span.

Each NEP may include RIP software (as described for example in Corner, "Internetworking With TCP/IP", pp. 109-121, incorporated herein by reference) that distributes or routes information to a desired address in accordance with a routing table. Such tables list each destination or network element address and a corresponding gateway or address of an intermediate processor for transferring the information to the destination. The RIP software can also be modified to have a high number of "hops" (i.e., to have a large number of network elements separating two network elements) while maintaining communication between those two network elements. Additionally, the software can be modified to distinguish NEPs in a span from other computers coupled to the Internet.

Before turning to the drawings in which like reference characters indicate the same or similar elements in each of the several views, several definitions are presented.

Multispan Definitions

To illustrate the various concepts of the invention, the following definitions of Multispan terminology and outlines of the procedures to setup Multispan Management capabilities for a network are provided below. It is to be understood that these definitions are for illustrative purposes only and do not affect the scope of protection.

To more fully appreciate the following terms, reference should be made to FIG. 1a.

ACS—alarm correlation system

Alarm—A degradation or failure of equipment or service which has been determined to be a root cause problem. A fault is promoted to an alarm when it can not be correlated to other faults or alarms in the system.

Fault—A degradation or failure of equipment or service. A fault may be a sympathetic result of another fault or alarm in the system.

NE—Network Element

NEP—Network Element Processor

MS objects—Multi span objects which include Logical Channel Source, Logical Channel Sink and Logical Channel Alarm objects.

Originating Source—An originating source is the entry point of the optical signal into the communications network of concatenated spans.

Terminating Sink—A Terminating sink is an exit point of the signal out of the network. A Logical Channel may have multiple terminating sinks in a drop and continue configuration such as at an OADM (optical add/drop multiplexer).

Logical Channel (LC)—A logical channel is the signal flow from the originating source to the terminating sink(s) on the communications network.

LC object—Logical Channel Object—A Logical channel data object.

Peer—a NE on interconnected span.

Peer NE—A Peer NE (network element) is a NE on a neighbor span that regenerates one or more Logical channels. In a mesh network configuration (not shown in the figure), a NE can have multiple peers. The invention, including the multispan features, may support a number of Peer NE's.

Logical Channel Peer—A Logical Channel Peer is the corresponding source or sink on a Peer NE that regenerates the logical channel.

Downstream—Optical signal flow from source to sink.

Downstream Channel Peer—A Downstream channel peer is a logical channel peer in the direction of the Optical signal flow from the Originating source to a Terminating Sink for the logical channel.

Upstream—Flow from sink to source.

Upstream Channel Peer—An Upstream channel peer is a logical channel peer in the direction of the flow from a Terminating Sink to the Originating Source for the logical channel.

Channel unit—channel bearing circuit packs that can include transceivers, receivers, transmitters, remodulators, and selectors.

Concatenated Spans—Spans that are connected together through a short reach interface (FIGS. 2a-c show various examples of concatenated spans.

MultiWave® Optical Network—A collection of CIENA® Transport Division optical networking equipment or other optical networking equipment that is interconnected. Span management and the enhancements described herein may also be used with various other communication systems as mentioned above.

Multispan Configuration

Before explaining some of the more advanced features of Multispan management, a procedural outline of Multispan configuration will be presented in this section. The configuration example described below refers to FIG. 1a.

Activation

Multispan capability may be ENABLED or DISABLED on each NE from a switch (hardware element or, preferably, software configurable element) on the NEP (network element processor). If using a software configurable element, a configuration screen may provided within a NE Manager. In order to use the Multispan feature correctly, this switch should be set to ENABLED on all the nodes on the WDM network in which Multispan functionality is desired.

Logical Channel Provisioning

Multispan configuration includes provisioning logical channels across the communications network. Multispan may be configured using a connection manager graphical user interface which may be part of the network monitoring interface 300 shown in FIG. 2d. A Logical channel may be provisioned by using the following information:

1. Logical Channel Origination
2. Logical Channel Circuit ID
3. NE Peers
4. Logical Channel Peers
5. Logical Channel Termination Logical Channel Origination The Logical Channel Origination may be provisioned at the Originating Source NE of the Logical Channel. In FIG. 1a, the Logical Channel Origination is provisioned at Node A for Logical Channel 1 and Node F for Logical Channel 2.

Logical Channel Circuit ID

The Logical Channel Circuit ID may be provisioned at the Origination Source NE of the Logical channel. As the Logical channel is provisioned across the network, Multispan automatically provisions the Logical Channel Circuit ID into the channel cards for the Logical channel across the entire network. Thus, any Circuit ID's that had been provisioned previously will be overwritten. The Circuit ID can only be re-provisioned at the Origination source NE of the Logical channel. Preferably, attempts to provision the Circuit ID at any other source or sink along the logical channel will fail.

NE Peers

The NE Peer may be provisioned at a NE on a span that has Logical channels flowing into a NE on a neighbor span, as well as the NE on the neighbor span that regenerates the Logical channels. The NE Peer provisioning specifies the Service Channel Network IP Address of the neighbor NE. In the example shown in FIG. 1a, Logical Channel 1 flows from Node C into Node D. Thus, node C is provisioned with the SCN IP Address of node D (192.168.39.12) and node D is provisioned with the IP Address of node C (192.168.37.11).

Logical Channel Peer

Logical Channel Peers are provisioned on each of the Peer NE's for a Logical channel. The Logical Channel Peer provisioning specifies the following assets for each Logical channel:

Peer IP Address—IP Address of the Peer NE for this Logical Channel.
Peer Frequency—Frequency of the Logical Channel on the Peer NE.
Peer Location—Shelf, Slot, and Unit of the Source or Sink card on the Peer NE.

The Logical channel assets are provisioned on both the upstream and downstream peer NE's. Using Connection Manager, the Logical Channel Peer can be configured in 2 ways: Rule-based Provisioning and Individual provisioning.

Rule-based provisioning is used when the same wavelength is regenerated on a Peer NE. Rule-based provisioning involves only provisioning the Peer IP Address for the channel. Preferably, the system automatically assigns the Peer Frequency and Location.

Individual provisioning is used when a different wavelength is regenerated on a peer NE. Individual provisioning involves specifying the Peer IP Address, Frequency and Location for the channel.

In the example shown in FIG. 1a, the Logical Channel Peers are provisioned on Nodes C, D.

On Node C, Logical Channel 1: Peer IP—192.168.39.12, Peer Frequency—192.60, Peer Location—2.3.1

On Node D, Logical Channel 1: Peer IP—192.168.37.11, Peer Frequency—192.50, Peer Location—2.11.1

Similarly, Logical Channel 2 is provisioned on Nodes C and D.

Logical Channel Termination

The Logical Channel Termination may be provisioned at a Terminating Sink NE of the Logical Channel. In an OADM architecture such as the ones shown in FIGS. 2b-c, the Logical Channel may have more than one Terminating Sink. In FIG. 1, the Logical Channel Termination is provisioned at Node F for Logical Channel 1 and Node A for Logical Channel 2.

Moreover, a provisioned Logical Channel may be deleted across the entire network.

Circuit ID Behavior

As mentioned earlier, the Logical Channel Circuit ID is automatically provisioned by Multispan into all the channel cards along the network that are associated with a particular logical channel. The Circuit ID behavior when a Logical channel is deleted or reconfigured is detailed below.

1. If a channel is deleted at the origination point, all channel ID's are cleared everywhere until the end of the channel.
2. If a channel is deleted at any intermediate source peer along the LC, the channel ID's are cleared for that source and all downstream nodes until the end of the channel.
3. If a channel is deleted at any intermediate sink peer along the LC, the channel ID's are cleared starting at source peer and all downstream nodes until the end of the channel.
4. If a channel is reconfigured to point from one peer to another, or as an origination or termination point, the channel ID's are cleared for all downstream nodes along the old channel.

Optical Communication Network Topologies

FIGS. 2a-c show details of exemplary optical communication networks in which the inventive systems and methods may operate.

More specifically, FIG. 2a illustrates a segment of an optical communications network having multiple spans. Like FIGS. 2b-c, FIG. 2a does not show the input or output of channels to/from the network as such elements are not necessary for a full and complete understanding of the invention.

Span 1 includes two terminal NE (network elements) 10, 20 connected to an AMP (amplifier) 12 with fiber (or other communications media). The bi-directional arrow indicates at least one fiber pair connecting the terminal NEs 10, 20 and the AMP 12. Span 1 is connected to span 2 via fiber (or other communications media) by connecting terminal NE 20 with terminal NE 30. Spans 2 and 3 are connected in a similar manner. Each of the terminal NEs 10, 20, 30, 40, 50, 60 includes a respective NEP.

As further shown in FIG. 2, the spans may include zero interspan network elements (span 3), only one (span 1), or multiple interspan network elements. These network elements may include elements such as AMPs 12, 32, 34 as shown in FIG. 2a. The network elements for each span may also include one ADM (add drop multiplexer) 35 (as shown in FIG. 2b) or multiple ADMs 35, 75 (as shown in FIG. 2c). A variety of other types of network elements may be utilized to construct a communications network as is know in the art many of which would benefit from the advantages provided by the invention.

FIG. 2b shows the alternative in which ADM 35 connects to a terminal NE 70 so that channels can be added or dropped between spans 2 and 4.

FIG. 2c shows the alternative in which ADM 35 connects to another ADM 75 that is located mid-span of span 4 such that channels can be added or dropped mid-span relative to spans 2 and 4.

Various other network and span topologies can be managed using the inventions disclosed herein. It is to be understood that FIGS. 1a-b and 2a-c show only a few examples of such networks. Furthermore, the invention is not limited to the optical networking examples of FIGS. 2a-c and may include a variety of other types of communications networks having multiple network elements at least some of which include an NCP 5.

Although FIGS. 2a-c show providing the terminal NEs 10, 20, 30, 40, etc with NCPs 5, the NCPs 5 may also be provided for any of the other NEs.

NEP 5 Architecture & Network Monitoring Interface 300

Figure 2D:
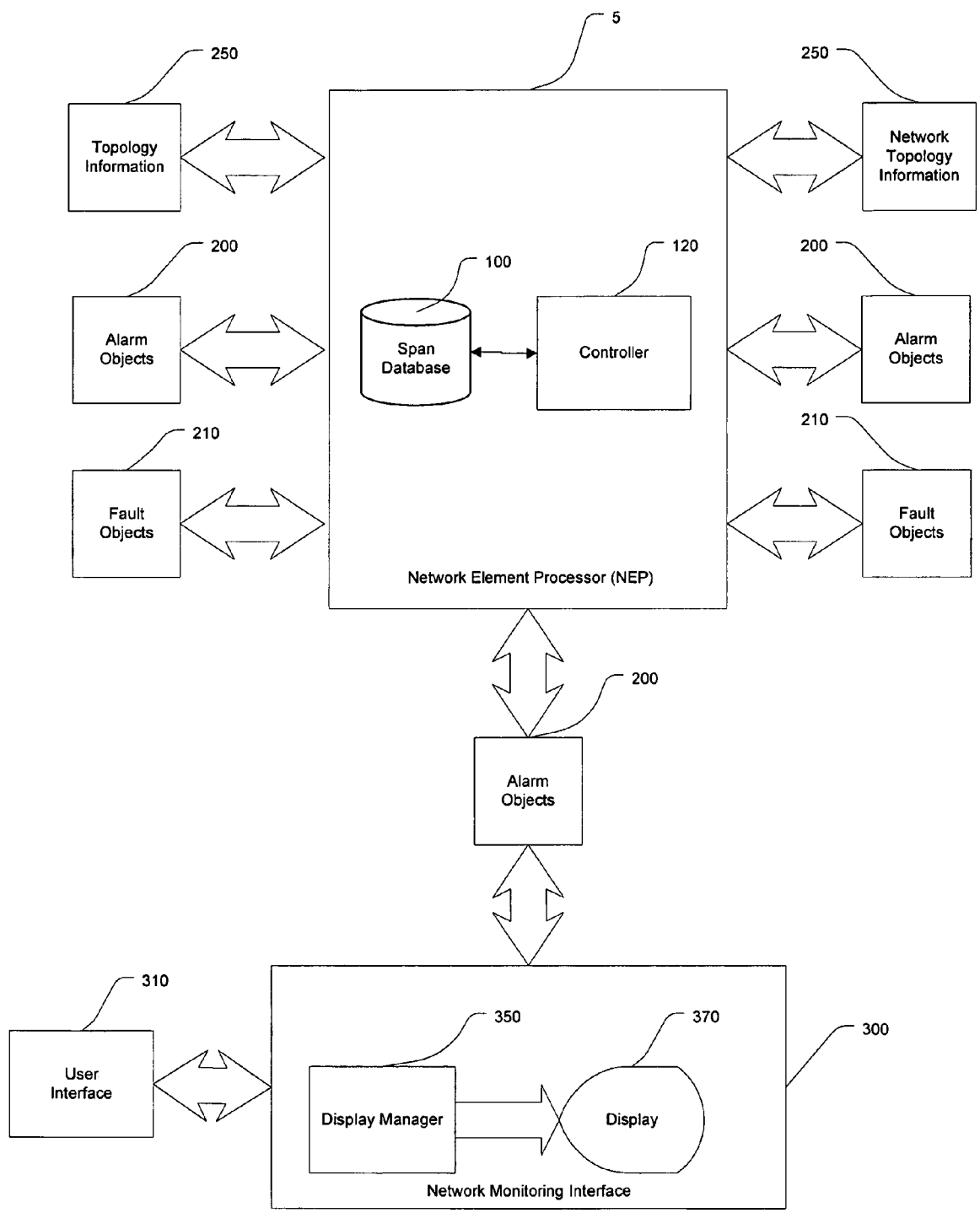
FIG. 2d is a high level block and data flow diagram of a nodal control processor according to the invention.

Each of the network element processors (NEPs) 5 may be constructed as shown in FIG. 2d. The NEP 5 may include a controller 120 connected to a span database 100. As further shown in FIG. 2d, the NEP 5 may receive and transmit alarm objects 200, fault objects 210, and network topology information 250 along both directions of the span (east and west) and ultimately along multiple spans of a multispan communications network. The processing of the alarm objects 200 and fault objects 210 is further described below particularly in regards to the flowcharts of FIGS. 5-12.

Span database 100 stores network topology information 250 which includes detailed information for each network element NE that is part of the network. This detailed information may include the IP address, functionality, peers, connectivity, equipment locations, and fault association information for each network element. The information stored by the span database 100 is further described below.

The alarm objects 200 may also be received by a network monitoring interface 300 that includes a display manager 350 and alarm display 370. Display manager 350 generates displays that are presented by alarm display 370. A user interface 310 may also be connected to the network monitoring interface 300.

In conventional systems, a fault occurring in a communications network may cause a large number of alarms to be generated. An operator viewing these alarms would find the array of alarms displayed confusing and perhaps bewildering particularly for a large network. By utilizing the methods and systems of the present invention, however, the number of alarms ultimately displayed by the alarm display 370 is sharply reduced thereby permitting the operator to rapidly understand, diagnose and fix the underlying faults.

Multispan Statuses and Alarms

Multispan provides variables to indicate the state of the configuration and alarms to flag errors that might occur during the configuration process. This section describes the statuses and alarms that may be emitted by the NEPs 5.

NE Peer Status

The NE Peer Status shows the state of the link between 2 NE Peers. The NE Peer Status may be displayed to a user upon command via the user interface 310 and network monitoring interface 300. The NE Peer Status can have the values shown in the table below.

| State | Alarm Severity | Description |
|---|---|---|
| Operational | None | Communication with the Peer is OK. |
| Disabled | None | Multispan is DISABLED on the NEP. |
| Comms Error | Warning | Communication is down with the Peer. Could be due to a configuration problem or a network problem. |
| Not Licensed | Normal | Multispan is not licensed on this NE. |

Logical Channel Peer Status

The Logical Channel Peer Status shows the state of the peer configuration that has been provisioned for a Logical channel. The Logical Channel Peer Status may be displayed to a user upon command via the user interface 310 and network monitoring interface 300. The Logical Channel Peer Status may have the values shown in the table below.

| State | Alarm Severity | Description | FIG. 1a Examples |
|---|---|---|---|
| NORMAL | None | The Logical channel provisioning on both Peer NE's point to each other. | Logical Channel 1 is configured as follows:<br>On Node C:<br>Peer IP -> 192.168.39.12<br>Peer Location -> 2.3.1<br>On Node D:<br>Peer IP -> 192.168.37.11<br>Peer Location -> 2.11.1 |
| MISMATCH | Warning | There is a mismatch in the provisioning on both Peer NE's. The Logical channel provisioning on this peer points to a certain peer on the Peer NE, but the peer on the Peer NE does not point back, or the peer is provisioned as an Origination or Termination point. | Logical Channel 1 is configured as follows:<br>On Node C:<br>Peer IP -> 192.168.39.12<br>Peer Location -> 2.3.1<br>On Node D:<br>Peer IP -> 192.168.37.11<br>Peer Location -> 2.12.1 |
| INCOMPLETE | None | The Logical Channel is not configured on one of the Peer NE's. This state is mostly shown during Step 4 mentioned in Section 3.2.3 when a logical channel peer has not been provisioned on both NE peers. | Logical Channel 1 is configured as follows:<br>On Node C:<br>Peer IP -> 192.168.39.12<br>Peer Location -> 2.3.1<br>On Node D:<br>Logical channel is not provisioned |
| UNCONFIGURED | Warning | The Logical Channel has been configured for an End point (Originating Source or Terminating Sink) but the Logical channel peer on the local NE has not been provisioned. | Logical Channel 1 is configured as follows:<br>On Node A:<br>LOGICAL CHANNEL ORIGINATOR. Peer Status is OK.<br>On Node C:<br>Logical Channel is not provisioned. Peer Status is UNCONFIGURED.<br>On Node F:<br>Logical channel is not provisioned. Peer Status is UNCONFIGURED. |

The span management software of the Condict '115 patent may be extended to provide enhanced single-span management services, management services for multiple spans, and dynamic control applications for new circuit packs. This section describes the user visible aspects of such extensions to span management.

These applications build on the original Span Management database 100 and communications protocols, increase the capabilities across a single span, and extend the capabilities across multiple spans.

The features are organized into two basic categories: Multi-Span and Single-Span. The Multi-Span features correlate alarms as well as provision and manage channel assets across multiple spans. The Single-Span features provision and manage channel assets across a span, enforce adherence to specific channel plans, and perform additional control applications which extend the system capabilities.

Physical Configuration

Multi-span management provides the capability to share information between related spans (preferably containing terminations) via an Ethernet or other communications system as described above. Multi-span management supports logical circuits which consist of interconnected optical signals traversing, for example, spans or Metro rings. Multi-span management supports linear (terminated at both ends), loop and Mesh (a terminal is interconnected to more than one terminal) NE architectures.

Multi-Span Alarm Correlation General Operational Features

Multi-Span Management suppresses the reporting of alarms and/or faults that are representative of conditions sympathetic to one or more root causes determined to be the root cause of the reported fault.

When reporting alarm conditions, multi-span management identifies all affected system facilities. These facilities include all optical channels and associated tributaries within the communications network.

Furthermore, Span Management determines all affected circuits from the root point of an alarm (the uncorrelated alarm).

Span management also identifies a logical channel across all interconnected spans within a network. Span management aggregates channel information for each span into a logical network channel information model.

Multi-Span Management simplifies the provisioning and surveillance of logical facilities within a network. These facilities include channels both within a span and regenerated across concatenated spans, and operating modes of algorithms within related collections of Network Elements.

Multi-Span Management reliably sets the operating modes of a system facility. These actions automatically configure all corresponding system assets (e.g., attributes on circuit packs).

Multi-Span Management detects and reports on system configurations that result in the assets supporting a facility being inconsistently provisioned.

Multi-Span Management supports the configuration and detection of logical channels within a network.

A user interface 310 and network monitoring interface 300 can be used to allow an operator to select the channel assets that form a logical channel. The channel provisioning services provide mechanisms to write the channel association information into channel ID (identification) and channel tag attributes.

Span Management correlates regenerated channels on the basis of user selectable rules. In an optical network, a minimum rule set may dictate the regeneration of a channel from one span onto subsequent spans using the same optical wavelength. Furthermore, span management may disable any optical sources across multiple spans that may be misrouted because of a faulty grating.

Multispan Management includes user interface display screens that are generated by display manager 350 of the network monitoring interface 300 and which allow the user the ability to monitor and perform span management across interconnected spans. These display screens, presented on display 370, also provide the users the ability to View the topology of the interconnected network by the channels in all the spans.

A Network Channel List menu presents information about all of the logical channels detected across the interconnected spans. At the Network channel list window, each network channel is identified by its logical channel tag, data rate, signal, and alarm status for this channel. A selection of a network channel presents information about the physical channel on each of the interconnected spans through which the logical network channel passes. The information presented includes span name, frequency of the channel on the span, direction, signal and alarm status for the channel on the span.

Functional Design Overview

The following section details the functional design for Multispan management. It includes:
The information model that is used to provide Multispan management capability.
The protocol that is used to exchange information across interconnected spans.
Applications built on the information and transport mechanisms The multi-span features may be added to a WDM, DWMD or other optical or nonoptical communication network having an embedded software (or ASIC) baseline to widely distribute services already available within the constraints of a single span using the span management protocol. The services provided by multi-span management include widely distributed alarm suppression and correlation services.

Logical Channel Configuration

There are 2 methods of configuring Logical channels:
Rule based, and
Individual Channel Provisioning The Rule based method uses the rule that the same frequency is used for the logical channel on the neighbor span. The user will provision the IP Address of the NE that all the logical channel's are connected to on the neighbor span. A Logical Channel that originates or terminates on a NE will have no peer configuration. Capabilities are provided to override selected channels, with the rules applying to all but the uniquely specified channels.

In the Individual Channel Provisioning method, the logical channel association information must be provisioned for each individual logical channel. The user provisions the following for each logical channel association:
Logical channel ID and Tag—provisioned only on the originating source NE of the logical channel.
IP Address of peer NE that this logical channel is connected to on the neighbor span.
Frequency of the logical channel on the neighbor span.
Unique Peer Identifier User configuration can be managed via a user interface.

Logical Channel Configuration Processing Database

The Logical channel configuration is written by user interface subsystems into attributes of the span database 100. The Logical channel configuration is stored in attributes associated with the channel cards. The following attributes are applied to each channel card:
Status of a logical channel
IP Address of peer node.
Shelf, Slot, and Port of Peer.
Frequency of Logical Channel on Peer Node.
Enable/disable multispan processing
Operational state of the Multispan subsystem
IP Address of known peer nodes.

Data Processing

The NEP 5 processes Logical channel configurations for both rule based and per-channel configurations on an individual channel basis. The controller 120 of NEP 5 registers with the database 100 to receive events whenever any one of the above attributes is updated.

Whenever an event is received, the NEP 5:
Retrieves all other configuration data associated with the logical channel from the database 100
Sends a message to terminate connections with a peer to the Multispan Protocol
  If the Peer IP Address changes for an existing frequency and that Peer is not the peer for any other channels.
  If the Module State changes to NOT OPERATIONAL.
Sends a message to establish connections with a peer to the Multispan Protocol if the IP Address received is for a peer that does not currently exist.
Sends a message to the multispan data management component to Add/Delete Logical Channel Source, Logical Channel Sink, and Logical Channel objects if applicable. This is described in detail in the section labeled "Multispan Data Management".
Notifies agents of changes in the logical channel configuration.

Multispan Data Management

This section describes the Multispan Data Management component of the invention. It describes the NEP 5's creation of the multispan objects 200, 210, the flow of the objects 200, 210 across the network and accumulation of objects into the multispan database 100.

Multispan Alarm Object 200

A Multispan Alarm Object 200 is created by the NEP 5 when an uncorrelated fault is detected for a channel and the fault condition may affect the channel (or circuit) downstream. The Multispan Alarm Object 200 is transmitted across the local Span and downstream along the channel path, across the network (see FIG. 2*d*) and to other spans if present.

A Multispan Alarm Object 200 is deleted when all associated uncorrelated alarms are cleared or when the corresponding channel configuration record is removed. See the section labeled Multispan Alarm Correlation and the flowcharts of FIGS. 3-12 for further details.

Upon receipt of a Multispan Alarm Object 200, the NEP 5 may:
Accept and store the alarm object 200 (Note there may be multiple Multispan Alarm objects 200 for a channel)
Discard the alarm object 200
Replace/update an existing matching alarm object 200
Store the alarm object 200 on the pending queue (if there is not yet enough information to determine to which channel this object belongs; this object is then dequeued and processed when additional data is available to make the channel determination)

Multiple Span Protocol

The Multi-Span protocol synchronizes the Multi-Span databases 100 within the span and across interconnected spans. The Multi-Span protocol uses the same mechanisms to exchange data as the local span protocol, but operates as point-to-point protocol across the interconnected spans. Multi-Span objects 200 are appended to the local span protocol message within the local span.

Functions

The multiple span protocol provides the following services:
Establishment and Termination of communications between interconnected spans.
Routing of Multispan Data across interconnected spans.
Synchronization of multispan data within all interconnected spans.

Messages

The types of messages are described in the following section.

A Hello Report message contains address, status and synchronization information to ensure distributed database 100 consistency.

A Delta Report message contains all multi-span objects 200, 210 that are changed from the last multi-span report. A Complete Report message contains all multi-span objects 200, 210.

A Request message is sent to request multi-span data objects 200, 210 from a peer. A full report is sent upon receiving this message with sequence number set to 0. A non-zero sequence number indicates to send all messages in the retransmission queue starting from the sequence number. A full report is sent if the protocol unable to find the requested sequence number in the retransmission queue.

Multispan Alarm Correlation

The purpose of multispan alarm correlation is to report the primary alarm(s) for a given fault, and to suppress secondary (sympathetic) alarms which may occur due to this fault. This reduces network traffic and overall network processing load as well as helping the operator quickly diagnose the network.

MultiSpan Alarm Correlation Services:
Handles a large number of concatenated spans
Correlation occurs between nodes on a single span (span ACS) and between spans (multispan ACS)
Alarm correlation preferably occurs in a downstream direction
Sink alarms are advertised across nodes/spans since there are downstream entities that can correlate to the sink alarms.
Multispan alarms are for a specific channel. Alarms affecting multiple channels (or circuits) result in the creation of an MS alarm object for each affected channel (or circuit).
Multiple multispan alarms may be generated on a given channel (or circuit).

Signal Fault Rule

Multispan signal fault alarms are generated for a single channel or for multiple channels. A multispan signal fault alarm is generated for any of the following reasons:
signal problem
laser shutdown
configuration error Alarm Correlation Delay When an alarm occurs, a delay may be used before an attempt is made to correlate the alarm on the local span. This allows all alarms and sympathetic faults generated on a span due to a fault to be collected or aggregated prior to the correlation process. In addition, the multispan correlation may also delay before attempting to correlate to multispan alarms. The multispan correlation delay may also be related to the hop count (the number of NEs or spans traversed). The hop count waiting time allows the multispan alarm to traverse from the upstream spans down to the current span. This allows the multispan alarms to be collected or aggregated prior to the multispan correlation process. This is further explained in relation to FIGS. 4, 5, 9, 10 and 11.

Implementation

When a fault occurs (thereby triggering fault object 210 generation), alarm correlation routines in the NEP 5 try to correlate the current fault object 210 to an existing fault object 210 or existing alarm object 200 on the local span. If a fault cannot be correlated, it is passed to multispan alarm correlation (MS ACS) for processing. MS ACS tries to correlate the current fault object 210 to an existing MS alarm object 200. If the current fault object 210 can be correlated, the current fault object 210 is suppressed. This suppression includes not promoting the current fault object 210 to an alarm object 200. If the fault cannot be correlated, the alarm is asserted. Channel-related alarms (those affecting one or more channels or circuits) also generate a MS alarm object (s) 200, which is passed to the local span and to downstream spans.

Figure 3:
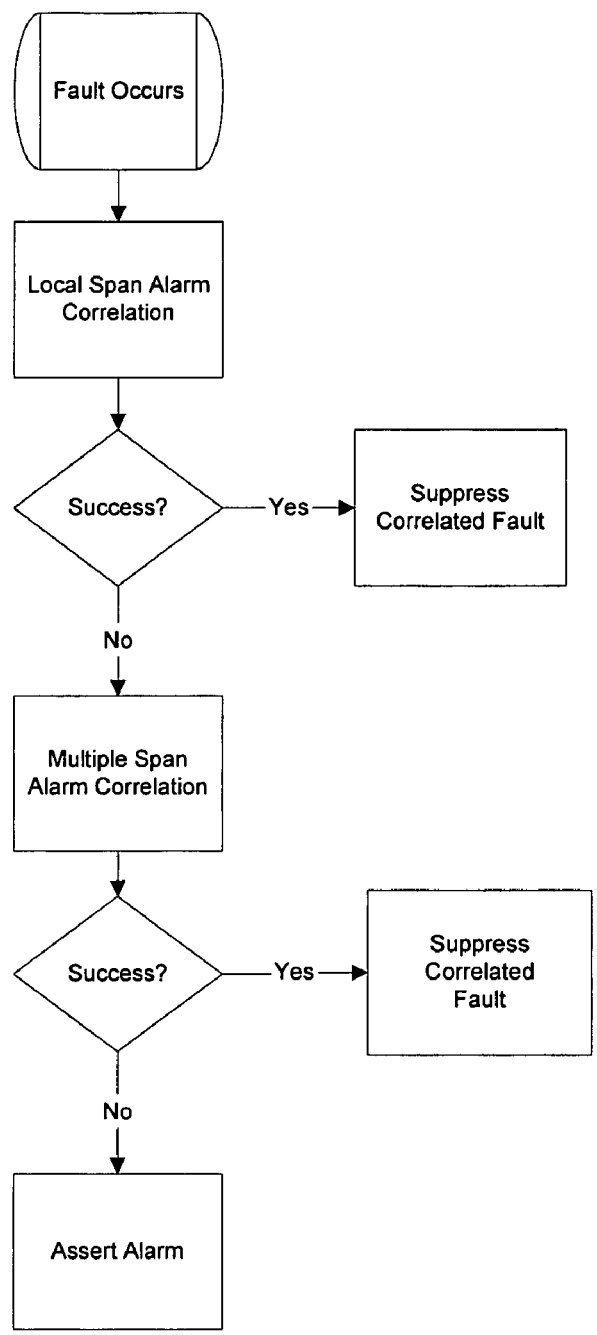
FIG. 3 is a high level flowchart showing local span and multispan alarm correlation concepts of the invention.

FIG. 3 illustrates an exemplary implementation of local span and multispan alarm correlation. As shown therein, when a fault occurs, local span alarm correlation attempts to correlate the fault to an existing fault or alarm object 210, 200 on the local span. If successful, the fault is correlated and an alarm is suppressed by, for example, not reporting a corresponding alarm object 200 to other NEPs 5 in a downstream span. If not, the multiple span alarm correlation tries to correlate the fault to alarm objects 200 occuring on other spans (multispan alarms). If successful, the fault is correlated and an alarm is suppressed by, for example, not reporting a corresponding alarm object 200 to other NEs in downstream spans. The fault is promoted to an alarm object 200 and transmitted to other NEs in downstream spans when it cannot be correlated to any other local fault or multispan alarm.

Figure 4:
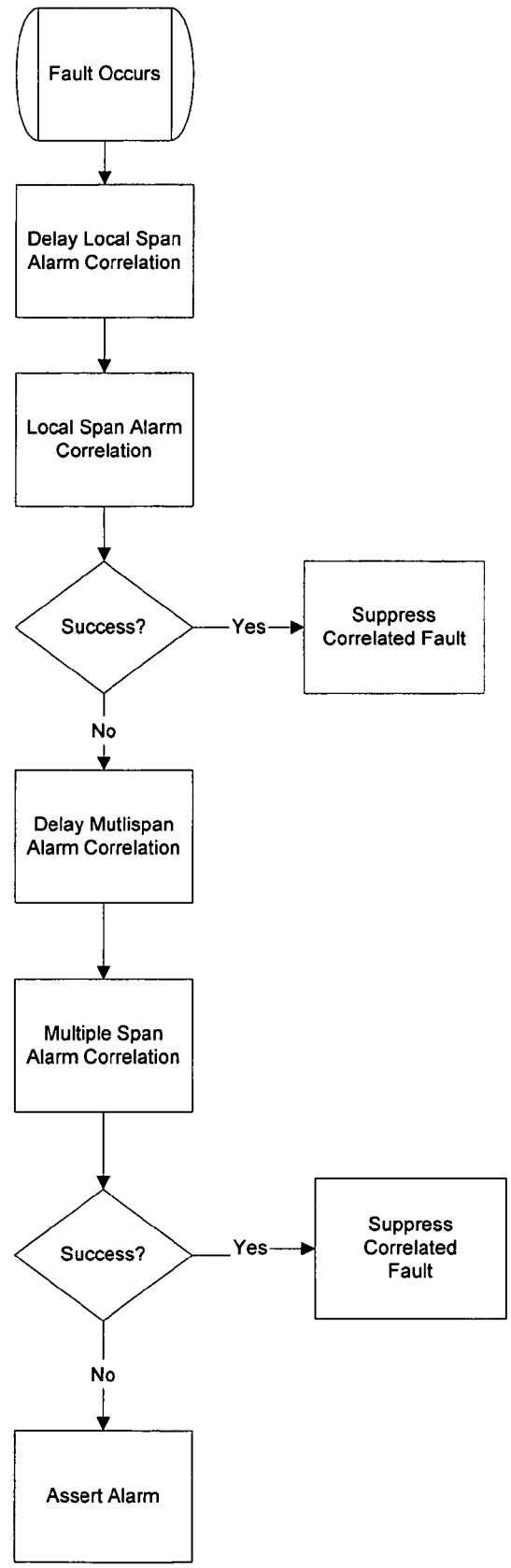
FIG. 4 is a high level flowchart showing local span and multispan alarm correlation and aggregation concepts of the invention.

FIG. 4 is similar to FIG. 3 but adds the optional alarm correlation delay to aggregate both the local span faults and the multispan alarms before correlating the current fault to the local span and multiple spans, respectively. As a further option, the alarm correlation delay may be used only for the local span alarm aggregation or only for the multispan alarm aggregation.

Channel Alarm Processing

Figure 5:
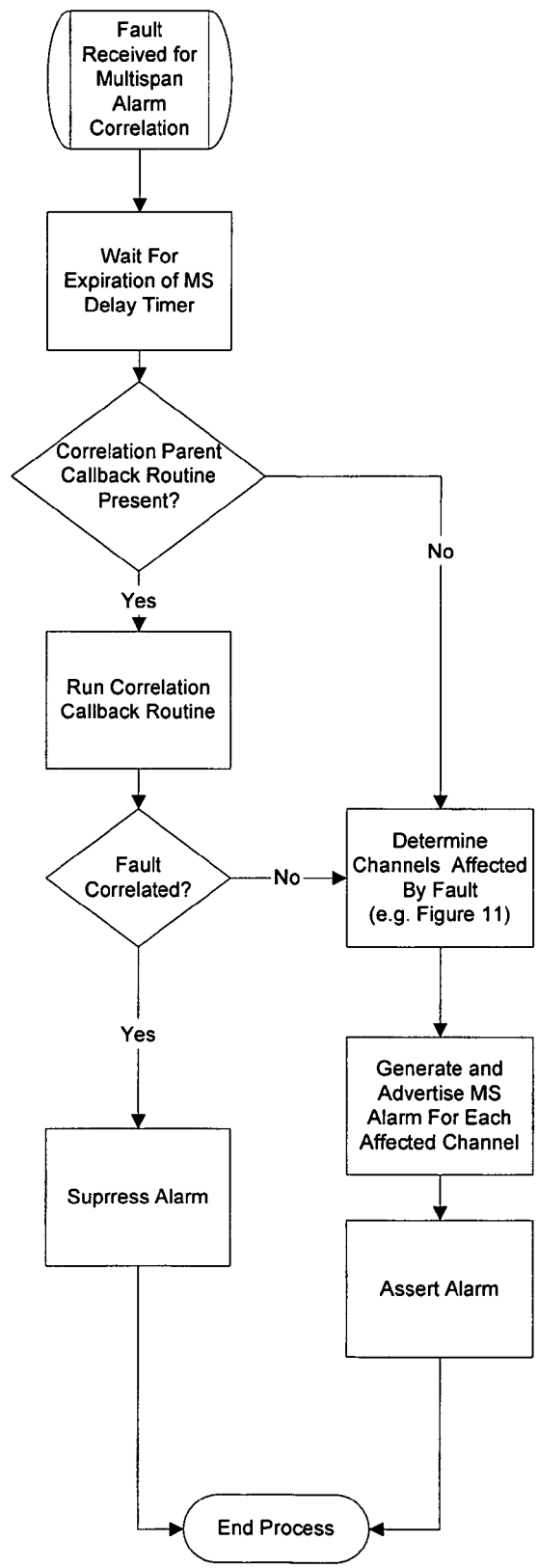
FIG. 5 is a high level flowchart showing single and multi channel alarm processing alarm processing according to the invention.

FIG. 5 illustrates a combined methodology for single/multi-channel processing. After waiting for the multispan delay timer to expire, a check is made to determine if there is a correlation callback present for the current multispan alarm object. If so, an alarm correlation routine (such as the one shown in FIG. 8 and further described below) is called for the current fault object 210.

If the current fault object 210 correlates, it is suppressed by suppressing the reporting of a current multispan alarm object 200 to other NEs (in other words, a parent or root cause alarm object 200 or fault object 210 was found so that the current fault object 210 should not be promoted to an alarm object 200 and need not be transmitted to other NEs.) If the current (original) fault 200 does not correlate, then it is asserted by promoting the fault object 210 to an alarm object 200 and transmitting the alarm object 200 to other NEs in downstream spans.

Alarm Timing Example West to East Direction

Figure 1B:
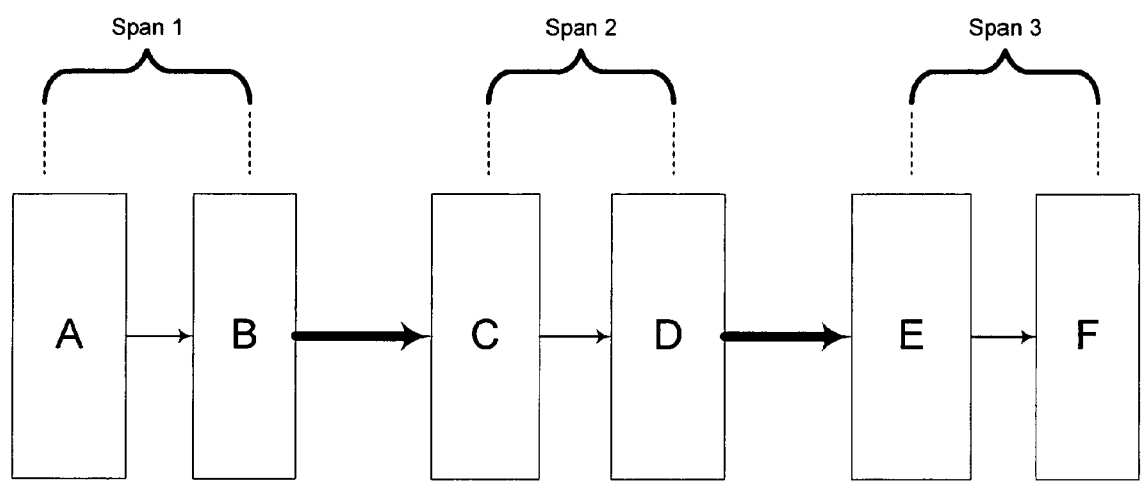
FIG. 1b is a high level block diagram of a multispan communications network for illustrating alarm aggregating timing concepts of the invention.

FIG. 1b is a simplified diagram of FIG. 1a and shows a multispan topology including terminal NEs (A, B, C, D, E AND F). Span 1 includes terminal NEs A and B. Span 2 includes terminal NEs C and D. Span 3 includes terminal NEs E and F. The small arrows indicate data flowing within a span and the large arrows indicate data flowing between spans. The following describes the timing of multispan alarm objects 200 if the optional delay is used to aggregate alarms. It is to be understood that the delay time used in this example is exemplary only and limitative of the invention.

Time 0:
  GFA (gain flattened amp amplifying multiple channels) signal fault occurs (A) corresponding channel faults occur (B C D E F)
  with up to 1 second delay, GFA fault object 210 is multicast on span 1 (A->B) with up to 1 second delay, channel faults 210 are multicast on spans 2, 3 (C->D, E->F)

Time 5:
  local alarm correlation at each span (A B C D E F)
  B D F locally correlate and suppress channel faults
  span 1 multispan alarm correlation (A B)
  MS signal fault alarm objects 200 are generated and sent from span 1 (B) to span
  2 (C) for all corresponding channels
  with up to 1 second delay, MS signal fault alarm objects 200 are multicast on span 2 (C->D) for all corresponding channels Time 7:
  MS signal fault alarm object 200 s are sent from span 2 (D) to span 3 (E) for all corresponding channels
  span 2 multispan alarm correlation (C D)
  C D correlate and suppress channel alarm objects 200
  with up to 1 second delay, MS signal fault alarms are multicast on span 3 (E->F) for all corresponding channels Time 9:
  span 3 multispan alarm correlation (E F)
  E F correlate and suppress channel alarm objects 200

Adding/Deleting a MS Alarm Objects 200

If an MS alarm object 200 is added to a channel, a check is made to determine if there is an existing MS Alarm Object 200 with its node's IP address and the same fault type stored in the span database 100. If a matching MS Alarm Object 200 is not found, a new MS Alarm Object 200 is created. This mechanism handles multiple alarm conditions for the same fault condition on the same channel on a node. An alarm count is increment by 1 for each uncorrelated alarm, and decreased by 1 each time an associated alarm clears. This ensures that the MS Alarm Object 200 is not deleted from the database 100 until all associated local alarm conditions have cleared. Note that when an MS Alarm Object 200 is deleted, the invention recorrelates any suppressed faults associated with this parent MS Alarm Object 200.

Recorrelating Alarm Objects 200

When an MS Alarm Object 200 is deleted, a check is made to determine any other fault objects 210 that were suppressed due to this MS Alarm Object 200 acting as a parent. Each formerly sympathetic fault is again processed by MS ACS to determine whether there is another reason to continue suppressing the fault object 210, or whether it should now be asserted as an alarm object 200.

Alarm Correlation Affected By List (ABL)

When an alarm is asserted, an "Affected by List" (ABL) or affected circuits report is generated for the network monitoring interface 300. This report contains a list of circuits, including mux tributaries, affected by this alarm. This report is provided on the NEP 5 where the alarm is generated. This report is built from existing database 100 information stored on the NE. If there are any channel changes to an existing ABL, the agent receives an updated ABL.

In addition to channels, the affected by list may also relate to circuits. A circuit may include a variety of different elements. For example, a typical high capacity communication network may include multiple levels of multiplexing one of which may be time division multiplexing (TDM) which takes multiple customer circuits and aggregates them into a single wavelength of a wavelength division multiplexed system. These wavelengths may then be aggregated into routerbands, and then these routerbands may be aggregated into a composite signal which is fed to the line amplifiers. A circuit, as used and defined herein may include any of these levels of multiplexing and may be generally described as the simplex path of data from the ingress point into the network, through the network and finally to an egress point in the network. An example of a simple circuit is the customer signal arrives as a transmitter, the signal is modulated to a different wavelength and multiplexed into the fiber and then finally received and demodulated back to the customer.

Moreover, the relationships between the alarms may be between common equipment (e.g., amplifiers) and circuits; common facilities (e.g., fiber) and circuits; circuit specific equipment (e.g., transceiver equipment failures) and circuits as well as conditions reported at downstream equipment.

Affected by List (ABL) Data

The ABL consists of a list of circuit ids. The ABL, a circuit id count and a flag (assert/clear or update) are sent to the NEP 5 with the event record containing the alarm. The ABL may be constructed with, for example, a set of ASCII circuit ids, separated by the NULL character.

Determining Affected Circuits

When an alarm is asserted in the correlated alarm log, the ABL is now part of the assertion. A single alarm generates one entry in its ABL, the circuit id of the affected circuit. A multiple alarm generates many entries in its ABL—the circuit ids of all its affected circuits.

Figure 11:
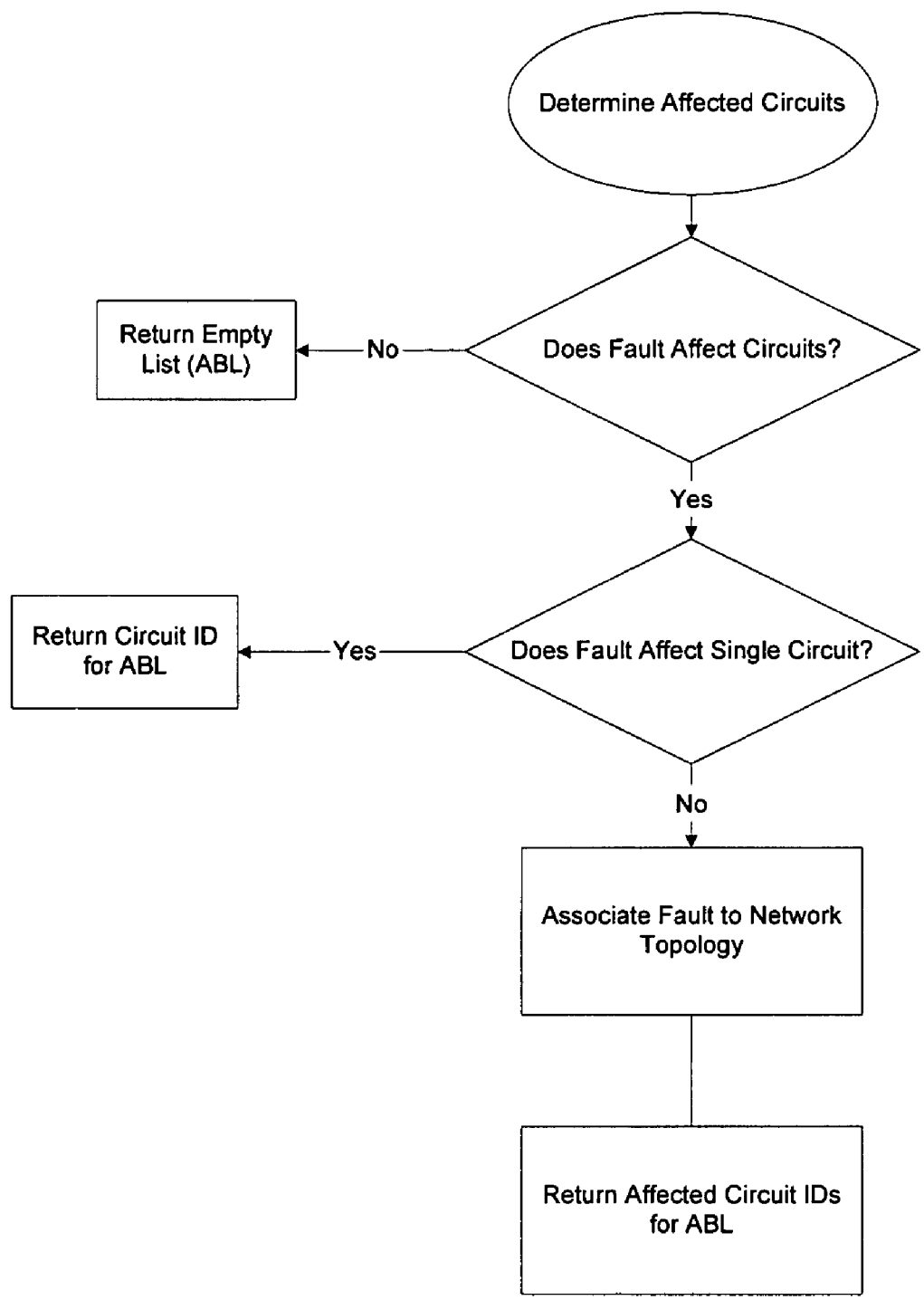
FIG. 11 is a high level flowchart showing nodal control processor functionality for determining which circuits affected by faults.

FIG. 11 illustrates an example of how the affected circuits may be determined. As shown therein, a determination is made as to whether the fault affects at least one circuit. If not, an empty ABL is returned. If yes, then the method determines whether the fault affects a single circuit in which cause the ABL is returned with the circuit ID that is affected by the fault. If more than one circuit is affected, then the fault is associated to the network topology stored in span database 100. From this association the ABL can be generated to include a list of all affected circuit IDs.

ABL Updates

If an alarm has been asserted and one of the affected channels' circuit id(s) changes, the ABL is re-asserted as an "update". This includes changing the circuit id(s) of an existing affected channel, adding a new channel which is now affected or deleting a channel which was affected.

Alarm Correlation and Fault Processing Procedures

This section outlines the procedures for correlating local span and multispan alarms as well as processing faults.

Fault Occurrence Processing

Figure 6:
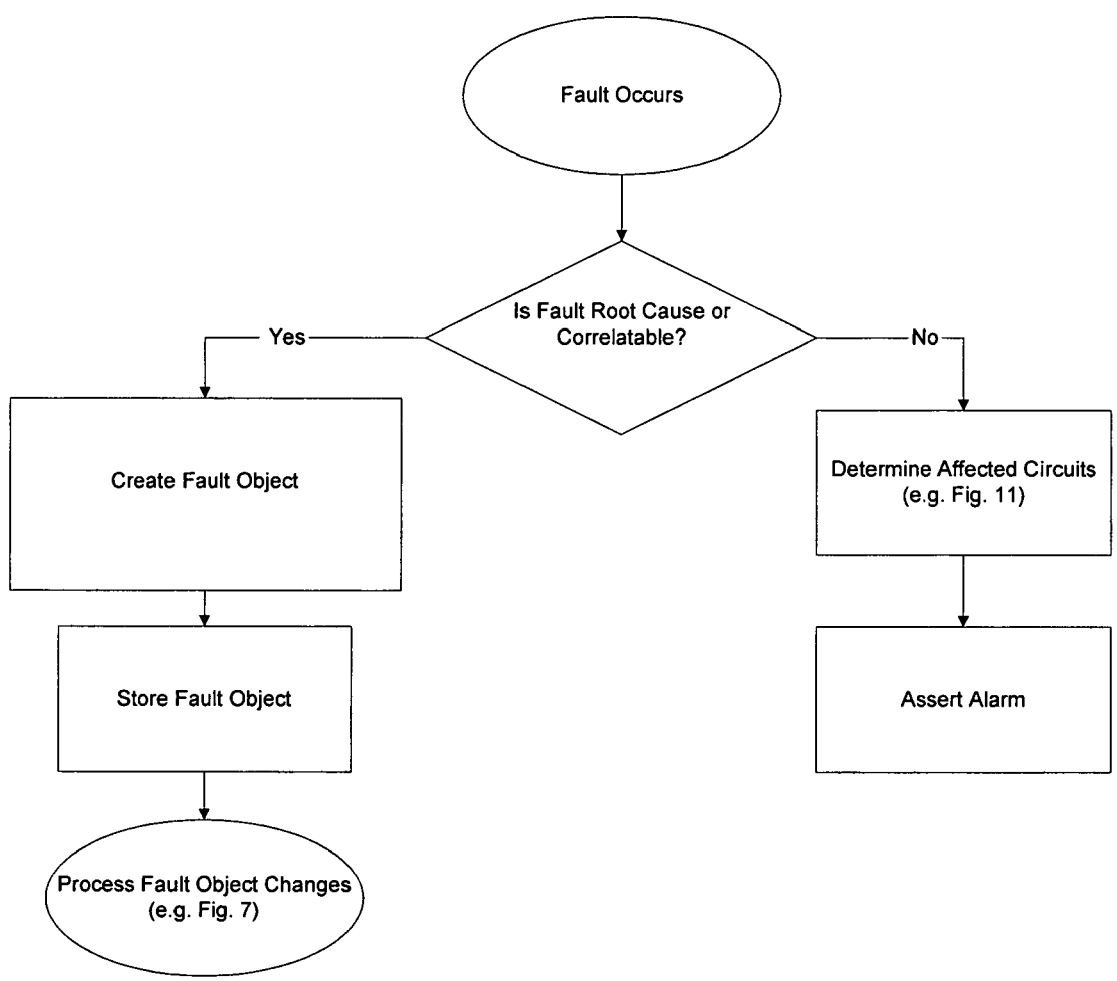
FIG. 6 is a high level flowchart showing nodal control processor functionality upon the occurrence of a fault according to the invention.

FIG. 6 illustrates the operation of NEP 5 upon the occurrence of a fault. The NCP 5 determines if the fault is a root cause of other fault objects 210 (or alarm objects 200) or if the fault is correlatable to other fault objects 210 (or alarm objects 200).

If the fault is not correlatable or a root cause (e.g. an equipment type alarm such as module specific failures that don't affect other parts of the system), then the NEP 5 first determines which circuits the fault may affect (a process more particularly described in relation to FIG. 11). An alarm object 200 is then asserted for each such affected circuit.

If the fault object 210 is correlatable or a root cause, then a fault object 210 is created and stored in span database 100. The creation of a new fault object 210 is a fault object change that is processed, for example, as shown in FIG. 7.

Processing Fault Object 210 Changes

Figure 7:
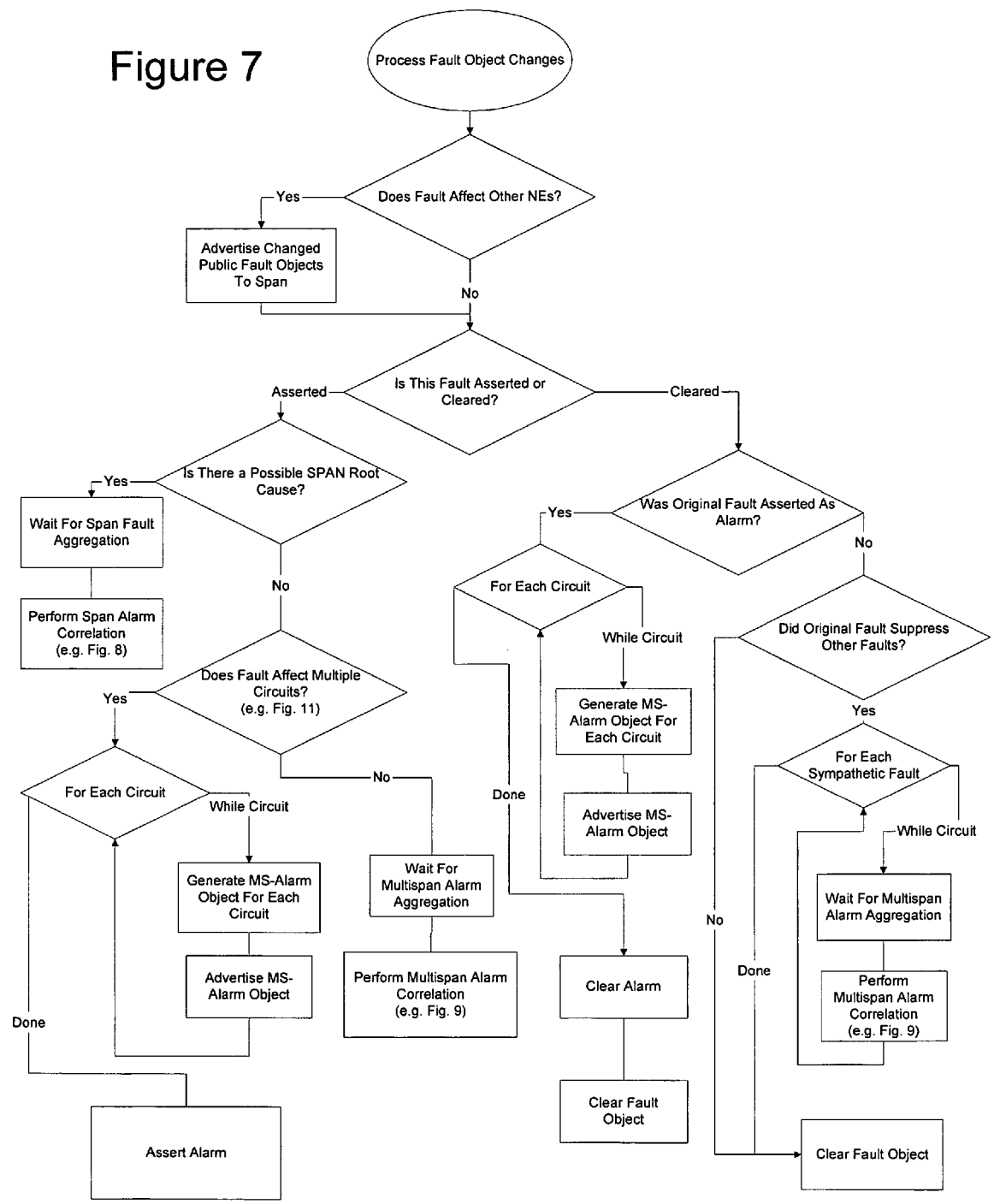
FIG. 7 is a high level flowchart showing nodal control processor functionality upon the occurrence of a change in a fault object according to the invention.

FIG. 7 illustrates how the NEP 5 processes fault object 210 changes. The NEP 5 determines whether the fault represented by the fault object 210 being processed affects other NEs. If yes, then the NEP 5 processing the changed fault object 210 advertises or otherwise transmits the fault object 210 (a.k.a. a changed public fault object) to the other NEs in the local span. Each NEP 5 that receives such a changed public fault object now populates its database with this fault object 210 and can now use this fault object 210 as a root cause fault and suppress other locally generated faults due to this one. This results in a distributed processing of fault objects 210 by the distributed NEPs 5.

If the fault object 210 does not affect other NEs, then the NEP 5 determines whether the fault object 210 is being asserted or cleared. In other words, is the fault object 210 being processed (e.g. for the first time) or is it in the process of being cleared from the database 100. A flag or other indicator may be used to determine whether the current fault object 210 is being asserted or cleared.

Fault Being Asserted

If asserted, then the NEP 5 determines if the there is a possible span root cause (something within the local span that caused this fault to occur) for the current fault object 210. If so, then the optional step of waiting for span fault aggregation may be executed. Span fault aggregation is discussed above and essentially introduces a delay before the correlation procedure is performed in order to aggregate other fault or alarm objects 210, 200 that may be occurring. The span alarm correlation that occurs following this aggregation is further described in relation to FIG. 8 below.

If the NEP 5 determines that there is no possible span root cause, then the NEP 5 determines whether the fault object 210 affects multiple circuits (see description above and FIG. 11). If yes, then for each circuit affected, a multispan alarm object 200 is generated and advertised to the affected NEs in other spans and an alarm is asserted for the original fault.

Figure 9:
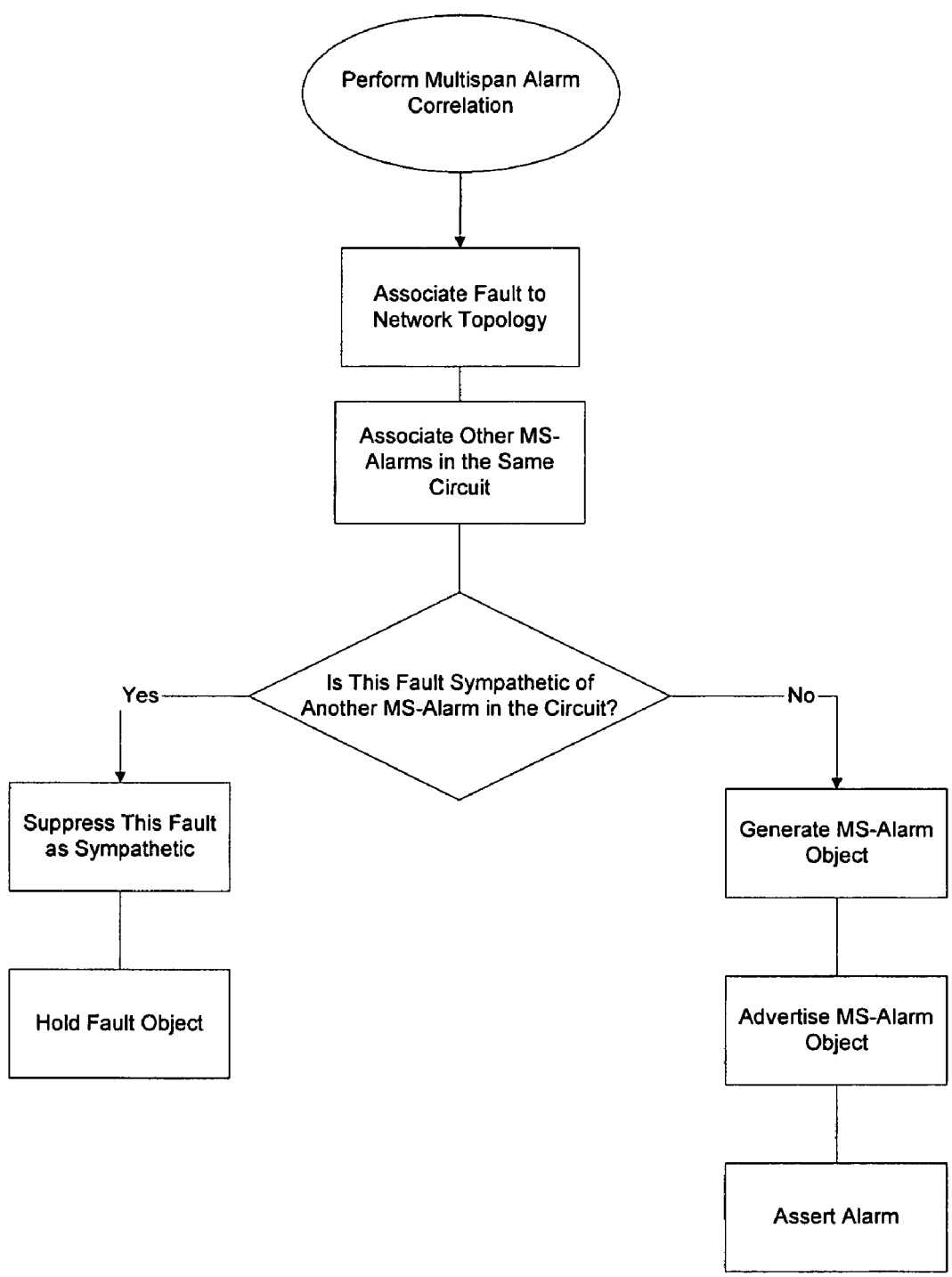
FIG. 9 is a high level flowchart showing nodal control processor functionality for performing multispan alarm correlation.

As further shown in FIG. 7, if the NEP 5 then determines that the fault object 210 does not affect multiple circuits, then the optional delay may be utilized to aggregate multispan alarm objects 200 (and fault objects 210) before performing multispan alarm correlation (as described in relation to FIG. 9).

Span Alarm Correlation

Figure 8:
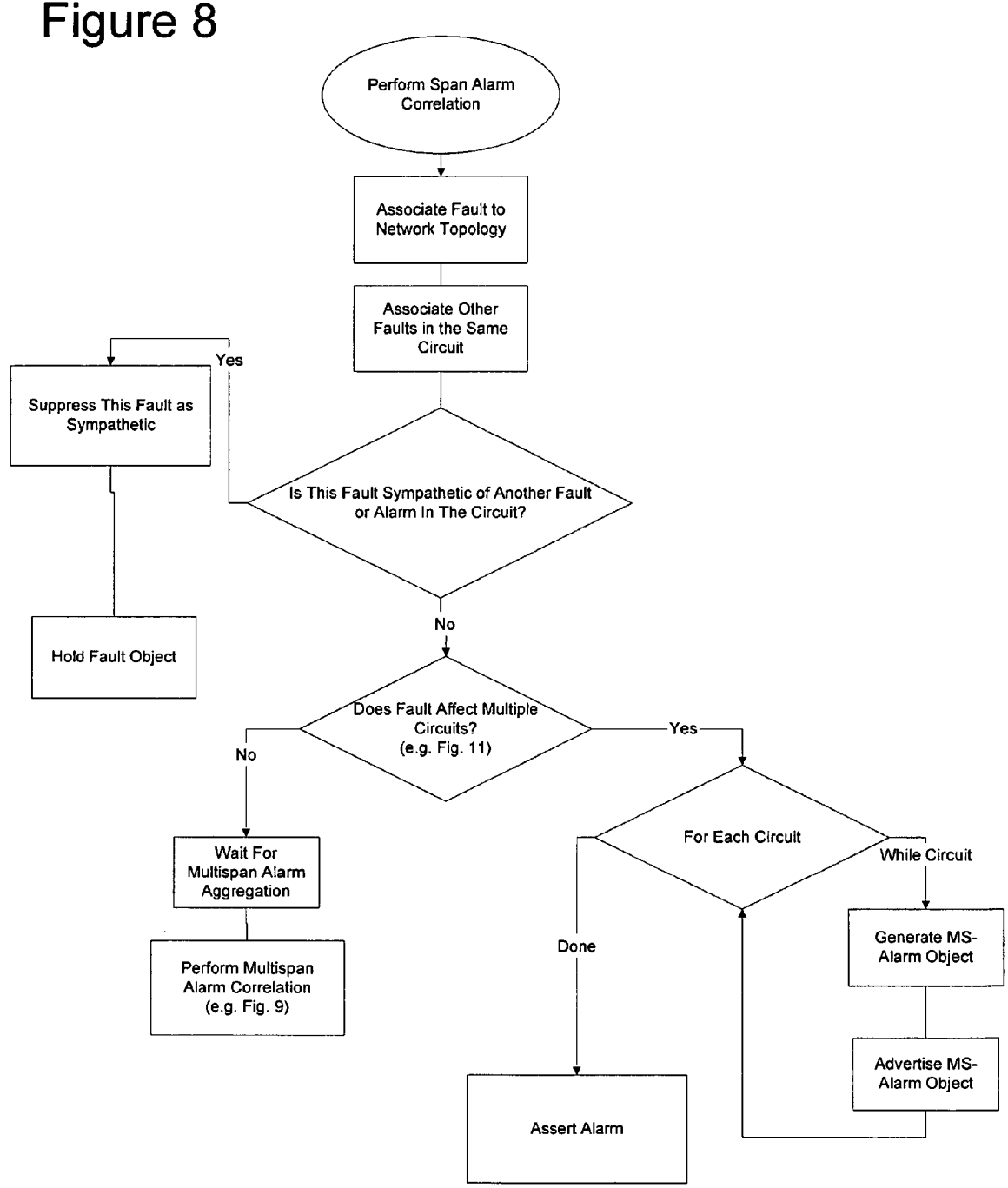
FIG. 8 is a high level flowchart showing nodal control processor functionality for performing span alarm correlation.

FIG. 8 illustrates an exemplary procedure for the NEP 5 to perform span alarm correlation. First it is determined whether there is a span root cause for the asserted fault object 210. In other words, is there a root cause on the local span which caused this fault to occur. This may be done by associating the fault object 210 to the network topology (stored in database 100) and associating the current fault object 210 to other fault objects 210 and alarm objects 200 in the same circuit. It may then be determined whether the fault is sympathetic of another fault (or alarm) in the circuit (was there a root cause that triggered a sympathetic fault). If the fault is sympathetic, it is suppressed by not reporting the fault to other NEs with a fault object 210 and holding (storing in database 100) the fault object 210 in the current NEP5 processing the fault object 210.

If not a sympathetic fault, the NEP 5 then determines if the fault affects multiple circuits (see description above and FIG. 11). If multiple circuits are affected by the fault then for each circuit, the NEP 5 generates and advertises a multispan alarm object 200 to the NEs affected by the fault as well as asserts an alarm for the current fault. Each of the NEPs 5 receiving the advertised multispan alarm object 200 will then process the changed (new) multispan alarm object as shown in, for example, FIG. 10 and described below.

As further shown in FIG. 8, if the fault does not affect multiple circuits then the optional waiting step that waits for multispan fault aggregation may be performed before performing multispan alarm correlation as described in relation to FIG. 9 below.

Multispan Alarm Correlation

FIG. 9 illustrates an exemplary procedure for the NEP 5 to perform multispan alarm correlation. First it is determined whether there is a multispan root cause for the asserted fault object 210. In other words, is there a root cause on any of the multiple spans which caused this fault to occur. This may be done by associating the fault to the network topology (stored in database 100) and associating the fault object 210 to other multispan alarm objects 200 (and fault objects 210) in the same circuit (also stored in database 100 as they are received). It may then be determined whether the fault object 210 is sympathetic to another fault object 210 or multispan alarm object 200 in the circuit (was there a root cause in any of the multiple spans that triggered a sympathetic fault).

As further illustrated in FIG. 9, if the fault object 210 is sympathetic, it is suppressed by not reporting the fault to other NEs with an alarm object 200 and holding the fault object 210 in the current NEP 5 processing the fault object 210. Suppressing fault objects 210 in this way reduces the number of fault objects 210 being transmitted and processed and thereby relieves congestion on the communications network and reduces processing time by other NEPs 5.

If not a sympathetic fault, the NEP 5 then promotes the fault to an alarm and generates and advertises a multispan alarm object 200 to the other NEs as well as asserts an alarm for the current fault. Each of the NEPs 5 receiving the advertised multispan alarm object 200 will then process the changed (new) multispan alarm object as shown in, for example, FIG. 10 and described below.

Process Alarm Objects 200

Figure 10:
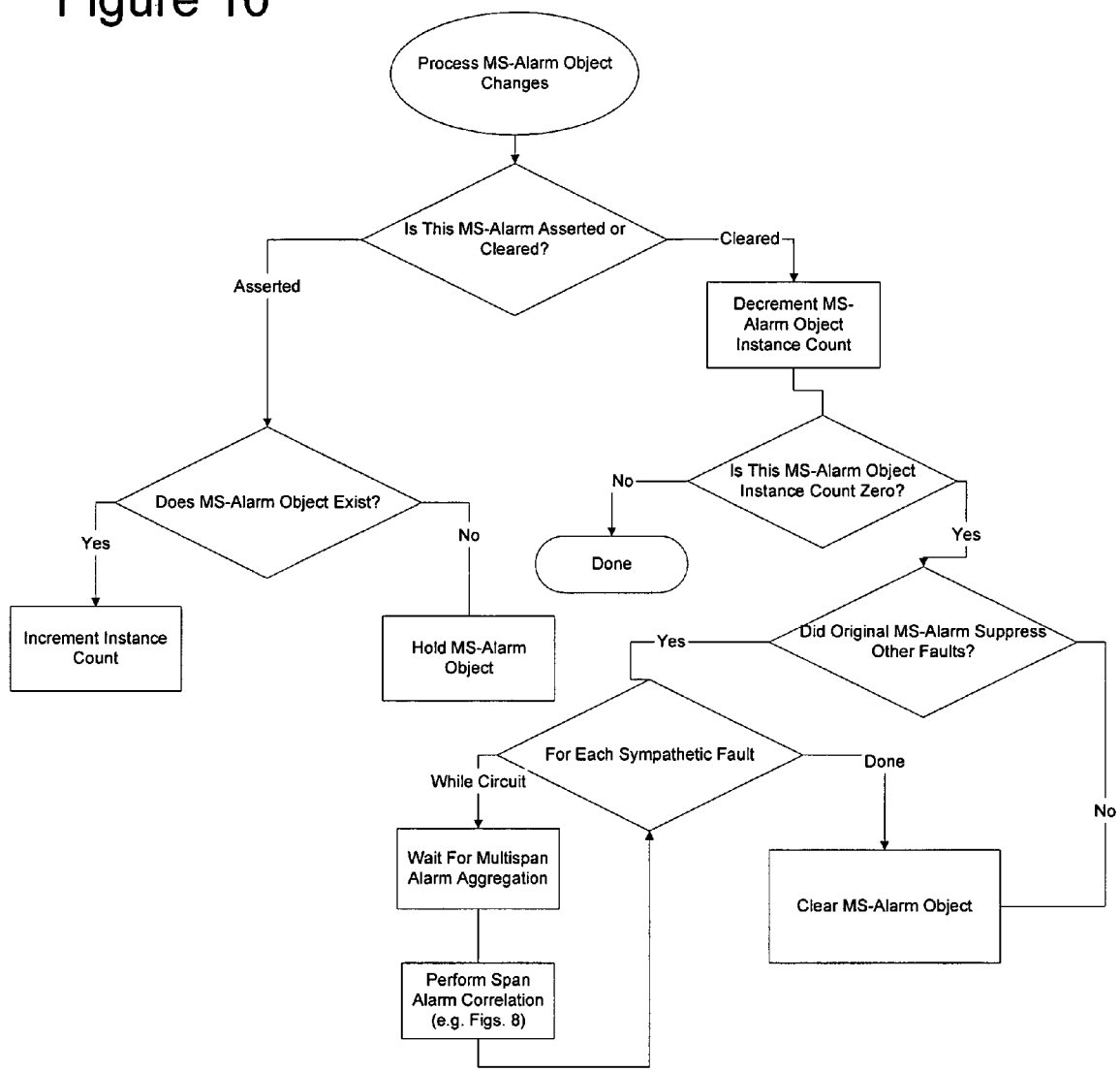
FIG. 10 is a high level flowchart showing nodal control processor functionality for processing multispan alarm object changes.

FIG. 10 illustrates the processing of alarm objects. Specifically, when an alarm object such as a multispan alarm object changes (e.g. is created, advertised, or updated), then such changes may be processed by each of the respective NEPs 5, each operating on its own received or generated alarm objects 200 in a parallel or distributed fashion.

As mentioned above, if an MS alarm added to a channel, a check is made to determine if there is an existing MS Alarm Object 200 with its node's IP address and the same fault type stored in the span database 100. If a matching MS Alarm Object 200 is not found, a new MS Alarm Object 200 is created. This mechanism handles multiple alarm conditions for the same fault condition on the same channel on a node. An alarm count is increment by 1 for each uncorrelated alarm, and decreased by 1 each time an associated alarm clears. This ensures that the MS Alarm Object 200 is not deleted from the database 100 until all associated local alarm conditions have cleared. Note that when an MS Alarm Object 200 is deleted, the invention recorrelates any child alarms associated with this parent MS Alarm Object 200.

This process may be implemented as shown in FIG. 10 which determines if the alarm object 200 is being asserted and then determines whether alarm object 200 already exists. In other words, the current alarm object 200 may be a subset of multiple alarm conditions for the same fault condition on the same channel on a node. If so, an instance counter is incremented to indicate another instance of the same or a corresponding alarm object 200. If not, the alarm object 200 is held in database 100.

As further shown in FIG. 10, if the alarm object 200 is being cleared, then the instance count (alarm object instance count) is decremented to indicate the clearance of one alarm from the alarm object 200.

When the instance count reaches zero (all associated local alarm conditions represented by the alarm object 200), then the invention recorrelates any child alarms (other alarms that were suppressed by the current alarm object 200). This is also shown in FIG. 10 which determines whether the original alarm object suppressed other faults. If yes, then for each such sympathetic fault, a span alarm correlation process (e.g. FIG. 8) is performed. As shown, the alarm correlation may delay after waiting for span fault aggregation. After accounting for and resolving (recorrelating) each of the suppressed fault(s) (child alarms) in this fashion, the NEP clears the alarm object 200. The alarm object 200 is also cleared after the instance count reaches zero and there are no other faults suppressed by the current alarm object (no child or sympathetic faults exist).

Clearing Fault Object Changes

FIG. 7 shows an exemplary process for clearing fault objects 210 from the span database 100 of each NEP 5. The right half of FIG. 7 shows this clearing process which first determines whether the fault object 210 affects other network elements. If so, then a changed public fault object 210 is advertised (transmitted) to each of the NEs on the local span. This ensures that other NEs affected by the current (original) fault object 210 will perform their own fault processing when the current fault object 210 clears.

Continuing the fault clearing process, the NEP 5 determines whether the original (current) fault was asserted as an alarm. If yes, then for each circuit in which the alarm was asserted, the NEP generates an MS alarm object 200 and advertises the MS alarm object 200 to the affected NE's so that the other NEPs 5 can clear the corresponding alarm objects stored in their respective databases 100. The current alarm and fault object 210 stored in the database 100 of the current NEP 5 are then cleared.

On other hand, if the NEP 5 determines that the original (current) fault was not asserted as an alarm, then the NEP 5 determines whether the original fault suppressed other faults. In other words, are there child faults (sympathetic faults) suppressed by the parent (current) fault. If yes, then for each such sympathetic fault in the circuit, the NEP 5 performs multispan alarm correlation (e.g. FIG. 9) after waiting for the optional multispan alarm correlation. In this instance, the multispan alarm correlation will effectively determine the root cause and suppress sympathetic faults.

After performing multispan alarm correlation for each such sympathetic fault in the circuit, the original fault object is cleared. The original fault object is also cleared after determining that the original fault did not suppress other faults (and when the original fault was not asserted as an alarm).

Circuit Update Processing

Figure 12:
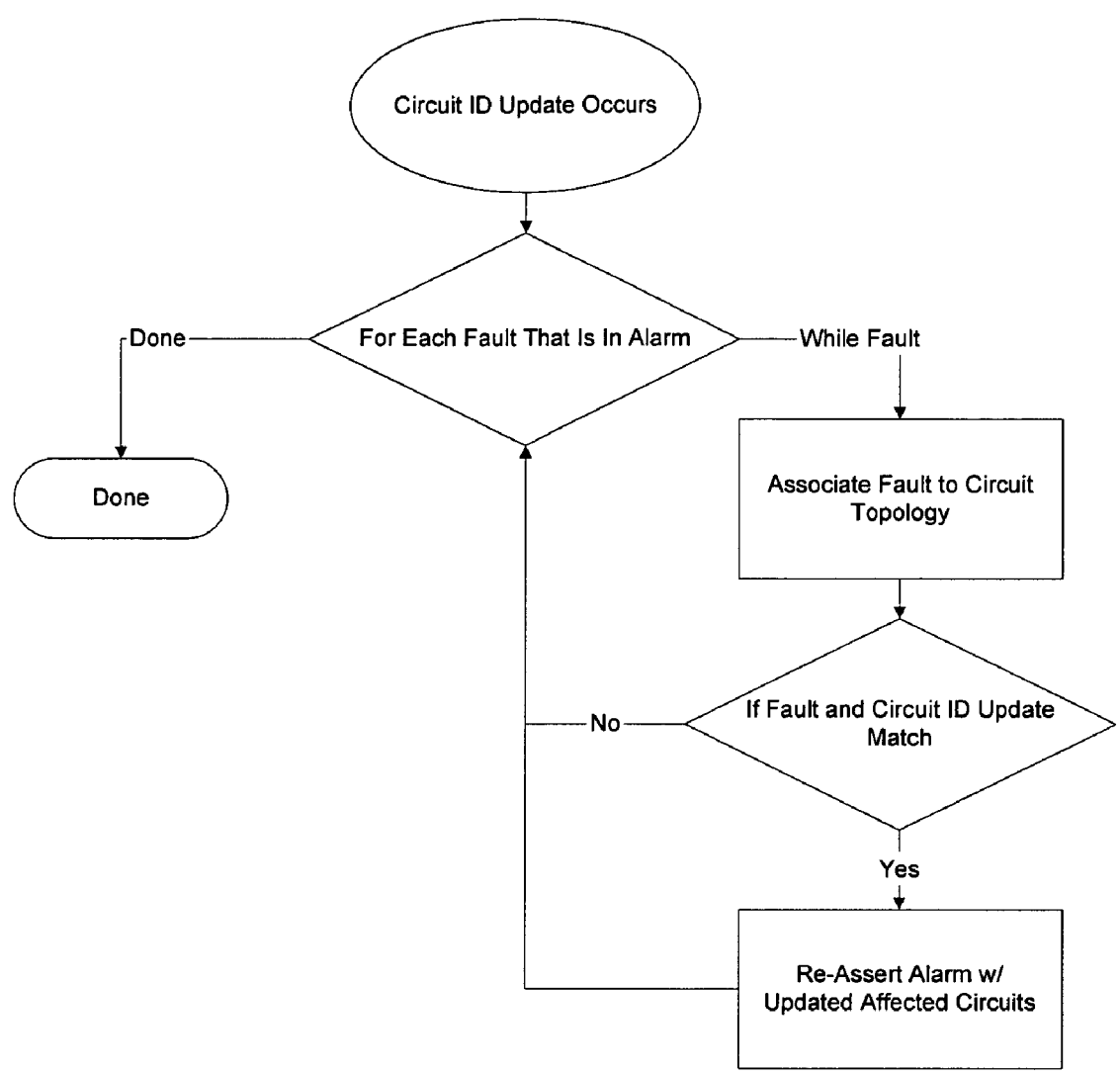
FIG. 12 is a high level flowchart showing nodal control processor functionality for processing circuit ID changes.

The invention utilizes distributed databases and processing. Circuit topology information is transmitted among the various NEs and stored in the respective span databases 100. Changes to the circuit topology affect fault and alarm object 200, 210 processing. FIG. 12 illustrates a methodology that accounts for such circuit topology changes and the effects thereof.

As shown in FIG. 12, when a circuit topology changes such as the ID (identification) of a circuit, then for each fault that is being asserted as an alarm object 200, the NEP's 5 storing that alarm object 200 in its span database 100 associate the fault to the circuit topology of the network. If the fault and circuit ID don't match then the alarm object 200 is reasserted for the updated circuits affected by the fault.

The invention being thus described, it will be obvious that the same may be varied in many ways. Such variations are not to be regarded as departure from the spirit and scope of the invention, and all such modifications as would be obvious to one skilled in the art are intended to be included within the scope of the following claims.

What is claimed:

1. A method of performing distributed management of a communications network having at least one span, comprising:
   receiving a fault;
   aggregating other faults and one or more alarms that may be occurring on the communications network; and
   correlating the other faults and the one or more alarms with the received fault to determine if the received fault is sympathetic to at least one of the alarms or the other faults;
   wherein said reciving, aggregating, and correlating steps are performed in a distributed manner by multiple network element processors in the communications network.

2. The method of performing distributed management of a communications network having at least one span according to claim 1,
   said aggregating step aggregating alarms and other faults by delaying operation of said correlating step.

3. The method of performing distributed management of a communications network according to claim 1, further comprising:
   suppressing reporting of the received fault to a network monitoring interface if said correlating step determines that the received fault is sympathetic to at least one of the alarms or at least one of the other faults.

4. The method of performing distributed management of a communications network according to claim 1,
   wherein the communications network includes multiple spans,
   said correlating step including:
      multispan aggregating one or more multispan alarms that may be occurring on the communications network;
      multispan correlating the one or more multispan alarms with the received fault to determine if the received fault is sympathetic to at least one of the other faults or at least one of the multispan alarms.

5. The method of performing distributed management of a communications network according to claim 4,
   said multispan aggregating step aggregating the multispan alarms by delaying operation of said multispan correlating step.

6. The method of performing distributed management of a communications network according to claim 4, further comprising:
   suppressing reporting of the received fault if said correlating step determines that the received fault is sympathetic to at least one of the multispan alarms or at least one of the other faults.

7. A network element of a communications network having at least one span, comprising:
   a span database; and
   a controller operatively connected to said span database and to other network elements of the communications network,
   said span database receiving a fault;
   said controller aggregating other faults and one or more alarms that may be occurring on the communications network in said span database; and
   said controller correlating the other faults and the one or more alarms with the received fault to determine if the received fault is sympathetic to at least one of the alarms or the other faults;
   wherein said span database is configured to receive faults from a plurality of controllers located in the communications network;
   wherein said plurality of controllers are configured to aggregate other faults and one or more alarms that may be occurring on the communications networks in said span database and correlate the other faults and the one or more alarms with the received fault to determine if the received fault is sympathetic to at least one of the alarms or the other faults.

8. The network element of a communications network having at least one span according to claim 7,
   said controller aggregating alarms and other faults by delaying execution of said correlating step.

9. The network element of a communications network having at least one span according to claim 8,
   said controller delaying correlating by a delay related to a number of other network elements in the communications network.

10. The network element of a communications network having at least one span according to claim 7,
    said controller suppressing reporting of the received fault to a network monitoring interface if said controller determines that the received fault is sympathetic to at least one of the alarms or at least one of the other faults.

11. The network element of a communications network having at least one span according to claim 7,
    wherein the communications network includes multiple spans,
    said controller multispan aggregating one or more multispan alarms that may be occurring on the communications network due to the other faults;
    said controller multispan correlating the one or more multispan alarms with the received fault to determine if the received fault is sympathetic to at least one of the other faults or at least one of the multispan alarms.

12. The network element of a communications network having multiple spans according to claim 11, said controller multispan aggregating the multispan alarms by delaying execution of multispan correlating.

13. The network element of a communications network having multiple spans according to claim 12, said controller delaying multispan correlating by a delay related to a number of other network elements in the communications network.

14. The network element of a communications network having at least one span according to claim 11, said controller suppressing reporting of the received fault if said controller determines that the received fault is sympathetic to at least one of the multispan alarms or at least one of the other faults.

15. A system of network elements of a communications network wherein at least two network elements are configured according to claim 7.

* * * * *